US007526455B2

(12) United States Patent
Benson et al.

(10) Patent No.: US 7,526,455 B2
(45) Date of Patent: Apr. 28, 2009

(54) TRUSTED DECISION SUPPORT SYSTEM AND METHOD

(75) Inventors: Greg Benson, Rancho Santa Fe, CA (US); Matthew Anthony Fistonich, San Diego, CA (US)

(73) Assignee: Palomar Technology, LLC, Del Mar, CA (US)

( * ) Notice: Subject to any disclaimer, the term of this patent is extended or adjusted under 35 U.S.C. 154(b) by 58 days.

(21) Appl. No.: 11/418,448

(22) Filed: May 3, 2006

(65) Prior Publication Data
US 2007/0022057 A1 Jan. 25, 2007

Related U.S. Application Data

(60) Provisional application No. 60/677,164, filed on May 3, 2005, provisional application No. 60/735,539, filed on Nov. 10, 2005.

(51) Int. Cl.
G06N 5/00 (2006.01)
(52) U.S. Cl. ............................................. 706/1; 706/45
(58) Field of Classification Search ...................... 706/1, 706/45; 600/300; 235/376
See application file for complete search history.

(56) References Cited

U.S. PATENT DOCUMENTS

| | | | |
|---|---|---|---|
| 4,636,634 A | 1/1987 | Harper | |
| 5,078,952 A | 1/1992 | Gozani | |
| 5,199,672 A | 4/1993 | King et al. | |
| 5,219,194 A | 6/1993 | Trent | |

(Continued)

FOREIGN PATENT DOCUMENTS
WO    WO 00/65770 A    11/2000

WO    WO 01/27794 A2    4/2001
WO    WO 01/63994 A    8/2001

OTHER PUBLICATIONS

International Preliminary Report on Patentability for PCT Application No. US2006/016895, dated Nov. 15, 2007, 11 pages.
International Preliminary Report on Patentability for PCT Application No. US2006/017100, dated Nov. 15, 2007, 8 pages.

(Continued)

Primary Examiner—Wilbert L Starks, Jr.
(74) Attorney, Agent, or Firm—Knobbe Martens Olson & Bear LLP

(57) ABSTRACT

Methods and apparatus for providing a comprehensive decision support system to include predictions, recommendations with consequences and optimal follow-up actions in specific situations are described. Data is obtained from multiple disparate data sources, depending on the information deemed necessary for the situation being modeled. Some embodiments perform complex systems modeling including performing massive correlative analyses of the data obtained from the multiple disparate data sources with current situational data obtained regarding the situation for which the decision support process is being utilized. The decision support system provides a prediction or predictions and a recommendation or a choice of recommendations based on the correlative analysis and/or other analyses. In some embodiments the decision support system provides possible consequences that could result from a recommendation. In other embodiments the decision support system provides a list of tasks for acting upon a recommendation. Also described are methods and apparatus for developing application specific decision support models. The decision support model development process may include identifying multiple disparate data sources for retrieval of related information, selection of classification variables to be retrieved from the data sources, assignment of weights to each classification variable, selecting and/or defining rules, and selecting and/or defining analysis functions.

27 Claims, 11 Drawing Sheets

U.S. PATENT DOCUMENTS

| | | | |
|---|---|---|---|
| 5,280,527 | A | 1/1994 | Gullman et al. |
| 5,345,809 | A | 9/1994 | Corrigan |
| 5,377,906 | A | 1/1995 | Mason |
| 5,416,706 | A | 5/1995 | Hagenbuch |
| 5,629,498 | A | 5/1997 | Pollock |
| 5,644,489 | A | 7/1997 | Hagenbuch |
| 5,696,884 | A | 12/1997 | Heckerman et al. |
| 5,774,876 | A | 6/1998 | Woolley |
| 5,963,131 | A | 10/1999 | D'Angelo et al. |
| 6,070,143 | A | 5/2000 | Barney et al. |
| 6,204,764 | B1 | 3/2001 | Maloney |
| 6,248,063 | B1 | 6/2001 | Barnhill et al. |
| 6,281,797 | B1 | 8/2001 | Forster |
| 6,370,222 | B1 | 4/2002 | Cornick |
| 6,398,727 | B1 | 6/2002 | Bui et al. |
| 6,448,898 | B1 | 9/2002 | Kasik |
| 6,483,434 | B1 | 11/2002 | Umiker |
| 6,560,592 | B1 | 5/2003 | Reid et al. |
| 6,594,578 | B2 | 7/2003 | Lai |
| 6,613,571 | B2 | 9/2003 | Cordery |
| 6,669,631 | B2 * | 12/2003 | Norris et al. ............... 600/300 |
| 6,707,381 | B1 | 3/2004 | Maloney |
| 6,763,299 | B2 | 7/2004 | Jones |
| 6,765,490 | B2 | 7/2004 | Lopez et al. |
| 6,768,421 | B1 | 7/2004 | Alioto |
| 6,782,302 | B1 | 8/2004 | Barto et al. |
| 6,801,819 | B1 | 10/2004 | Barto et al. |
| 6,919,803 | B2 | 7/2005 | Breed |
| 6,988,279 | B1 | 1/2006 | Kanevsky |
| 7,032,816 | B2 * | 4/2006 | Markham et al. ............ 235/376 |
| 7,046,138 | B2 | 5/2006 | Webb |
| 7,126,473 | B1 | 10/2006 | Powell |
| 7,218,974 | B2 | 5/2007 | Rumi et al. |
| 7,225,031 | B2 | 5/2007 | Feliss et al. |
| 7,334,130 | B2 | 2/2008 | Bowers |
| 7,353,532 | B2 | 4/2008 | Duri et al. |
| 2002/0017977 | A1 | 2/2002 | Wall |
| 2002/0017989 | A1 | 2/2002 | Forster et al. |
| 2002/0083022 | A1 | 6/2002 | Algazi |
| 2002/0083067 | A1 | 6/2002 | Tamayo et al. |
| 2002/0120864 | A1 | 8/2002 | Wu et al. |
| 2002/0124664 | A1 | 9/2002 | Call |
| 2002/0138017 | A1 | 9/2002 | Bui et al. |
| 2002/0152185 | A1 | 10/2002 | Satish |
| 2003/0056113 | A1 | 3/2003 | Korosec |
| 2003/0227392 | A1 | 12/2003 | Ebert |
| 2004/0006398 | A1 | 1/2004 | Bickford |
| 2004/0026491 | A1 | 2/2004 | Beckert |
| 2004/0041706 | A1 | 3/2004 | Stratmoen et al. |
| 2004/0066887 | A1 | 4/2004 | Garfinkle |
| 2004/0122703 | A1 | 6/2004 | Walker et al. |
| 2004/0122709 | A1 | 6/2004 | Avanish et al. |
| 2004/0174259 | A1 | 9/2004 | Peel et al. |
| 2004/0196182 | A1 | 10/2004 | Unnold |
| 2004/0233055 | A1 | 11/2004 | Canich |
| 2004/0257223 | A1 | 12/2004 | Webb et al. |
| 2004/0260666 | A1 | 12/2004 | Pestotnik et al. |
| 2005/0261934 | A1 | 11/2005 | Thompson |
| 2006/0080316 | A1 | 4/2006 | Gilmore et al. |
| 2007/0164857 | A1 | 7/2007 | Odenwald et al. |

OTHER PUBLICATIONS

International Search Report for International application No. PCT/US2006/017100 dated Feb. 13, 2007.

"Neural Networks" Electronic Textbook Statsoft. 1998 p. 1-31.

* cited by examiner

1100 ↘  ╭─ 1105

| Model |
|---|
| Number: 29387   Name: Aviation Safety-West Coast, USA |
| Created by |
| Name: Fred Small   ID: 3339975 |
| Dates |
| Creation date: 2/21/2004   Modification History: Yes |
| Authorization Levels |
| Edit: 3   Copy: 4   Delete: 9 |

╭─ 1110

| Application Area |
|---|
| Civil Aviation |

Data Sources   ╭─ 1115

| ID | Label | Path | Authorization Code |
|---|---|---|---|
| 1001 | Aircraft | FTP://faa.gov/secure/aircraft.dbs | R678K076 |
| 2002 | Routes | FTP://faa.gov/secure/west/routes | K90876H654 |
| 3003 | Alaska Maint | FTP://tech.alaska.com/secure/maint.dbs | F45333V7 |

Variables   ╭─ 1120

| Source | Field | Data Type | Category | Weight |
|---|---|---|---|---|
| 1001 | Nr3x | numerical | vehicle registration nr | 2 |
| 1001 | Tp3x | Text | vehicle model | 4 |
| 1001 | Wt3x | numerical | vehicle payload | 3 |

╭─ 1125

| Timeframe | Location |
|---|---|
| Persons: Age 18 to present | Context: USA presence |
| Aircraft: Model start to present | Context: Global |
| Routes: 1940 to present | Context: USA presence |

╭─ 1130

| Rule Definition | Use System/Application |
|---|---|
| Persons: Rule set 87 | SuperSam3: Zaptron FIDE |
| Aircraft: Rule set 49 | BigBlue5: Zaptron FIDE |
| Routes: Rule set 23 | FatJoe: Zaptron FIDE |

╭─ 1135

| Analytical Processes | Use System/Application |
|---|---|
| Bayes: set 45A | BigBlue5: MatLAB 7 |
| Regression: linear | SuperSam3: SAS/STAT |
| Mining: artifacts | SuperSam3: DataCruncher |

*FIG. 11*

TRUSTED DECISION SUPPORT SYSTEM AND METHOD

CROSS-REFERENCE TO RELATED APPLICATIONS

This application claims priority of U.S. provisional application Ser. No. 60/677,164 filed on May 3, 2005, and of U.S. provisional application Ser. No. 60/735,539 filed on Nov. 10, 2005, both of which are incorporated by reference in their entirety. This application is one of a set of related U.S. applications, the set including: TRUSTED MONITORING SYSTEM AND METHOD Ser. No. 11/418,385, filed on even date herewith; TRUSTED MONITORING SYSTEM AND METHOD Ser. No. 11/418,381, filed on even date herewith; TRUSTED MONITORING SYSTEM AND METHOD Ser. No. 11/418,380, filed on even date herewith; TRUSTED MONITORING SYSTEM AND METHOD Ser. No. 11/418,472, filed on even date herewith; TRUSTED MONITORING SYSTEM AND METHOD Ser. No. 11/417,910, filed on even date herewith TRUSTED MONITORING SYSTEM AND METHOD Ser. No. 11/418,496, filed on even date herewith; TRUSTED DECISION SUPPORT SYSTEM AND METHOD Ser. No. 11/417,887, filed on even date herewith; TRUSTED DECISION SUPPORT SYSTEM AND METHOD Ser. No. 11/418,448, filed on even date herewith; TRUSTED DECISION SUPPORT SYSTEM AND METHOD Ser. No. 11/418,382, filed on even date herewith; TRUSTED DECISION SUPPORT SYSTEM AND METHOD Ser. No. 11/418,395, filed on even date herewith; TRUSTED DECISION SUPPORT SYSTEM AND METHOD Ser. No. 11/418,447, filed on even date herewith; TRUSTED DECISION SUPPORT SYSTEM AND METHOD Ser. No. 11/417,893, filed on even date herewith; all of which are incorporated by reference in their entirety.

BACKGROUND OF THE INVENTION

1. Field of the Invention

The field of the invention relates to complex data modeling and data modeling. More particularly, the invention relates to massive correlative analysis and predictive modeling.

2. Description of the Related Art

The exponential increase of information over the last half-century is widely reported yet the impact of this on decision making has gone largely unnoticed. It's not that the decisions themselves have become more difficult—just that our expectations have become exponentially higher as a result of the volume of available data, coupled with our access to vast computer processing power.

As most any modem decision-maker can attest, this volume of information surrounding decisions is not always helpful. In all but very few cases, one must rely upon myriad disparate sources of information, each having been gathered and structured in its own idiosyncratic way. This causes several fundamental problems: 1) the information is often collected or input by inadequately trained individuals who don't understand the importance of consistent, quality data; 2) each database is designed to serve a particular purpose and rarely lends itself to use outside the narrow scope of its original purpose (e.g. comparing apples to oranges); and 3) most data collected is not accurately synchronized with a time/space context that all but prevents accurate cross-referencing with similar information.

For decades researchers have been attempting to address this growing problem. Solutions have been labeled everything from Recommender Systems to Artificial Intelligence, but met with only modest results. This disappointing outcome can be attributed partially to the fundamental data weaknesses outlined above and partially to the myopic scope of these earlier solutions. A growing body of research in complex systems theory suggests that many phenomena are significantly impacted by a large number of adjacent spheres of influence—an observations referred to as "small world networks". In field after field, researchers are discovering a high degree of interconnectivity that reveals new correlations never before understood. This has led some to draw a parallel to a similar phenomenon in the social domain called "Six degrees of separation". This work has recently been successfully verified in applications ranging from protein-protein interactions in a cell to the behavior of a terrorist cell. In all these cases, the common theme is the behavior of each component depends on the behavior of others. Thus there is a need for improved systems and methods for making decisions and for carrying out related tasks

SUMMARY OF THE INVENTION

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Inventive Embodiments" one will understand how the features of this invention provide advantages over other error management solutions.

Another embodiment is a decision support system, including a database containing data from a plurality of disparate data sources, and an electronic device configured to classify the database data and assign weighted values to the data based at least in part on the classification. The electronic device is further configured to analyze the database data so as to provide at least one recommended action and outcome information for the at least one recommended action.

Another embodiment is a decision support system, including a sensor network, a database configured to store data from the sensor network, and an electronic device configured to classify the database data and assign weighted values to the data based at least in part on the classification. The electronic device is further configured to analyze the database data so as to provide at least one recommended action and outcome information for the at least one recommended action.

Another embodiment is a goal seeking system including an action database including database actions, an outcome database including outcomes associated with the actions, and an electronic device configured to receive target goal information. The electronic device is configured to provide at least one recommended action to achieve the target goal.

Another embodiment is a decision support system, including a database containing data from a plurality of disparate data sources, and an electronic device configured to analyze the database data so as to provide at least one recommended action and a plurality of recommended tasks to perform the recommended action.

BRIEF DESCRIPTION OF THE DRAWINGS

FIG. 11 is an example template that can be created for an application with the process of FIG. 3.

DETAILED DESCRIPTION OF CERTAIN INVENTIVE EMBODIMENTS

Methods and apparatus for providing a comprehensive decision support system to include predictions, recommendations with consequences and optimal follow-up actions in specific situations are described. Data can be obtained from multiple disparate data sources, depending on the information deemed necessary for the situation being modeled. Some embodiments perform complex systems modeling including performing massive correlative analyses of the data obtained from the multiple disparate data sources with current situational data obtained regarding the situation for which the decision support process is being utilized. The decision support system may provide a prediction or predictions and a recommendation or a choice of recommendations based on the correlative analysis and/or other analyses. In some embodiments the decision support system may provide possible consequences that could result from a recommendation. In other embodiments the decision support system may provide a list of tasks for acting upon a recommendation. Also described are methods and apparatus for developing application specific decision support models. The decision support model development process may include identifying multiple disparate data sources for retrieval of related information, selection of classification variables to be retrieved from the data sources, assignment of weights to each classification variable, selecting and/or defining rules, and selecting and/or defining analysis functions.

In the following description, specific details are given to provide a thorough understanding of the disclosed methods and apparatus. However, it will be understood by one of ordinary skill in the art that the disclosed methods and apparatus may be practiced without these specific details. For example, electrical components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1:
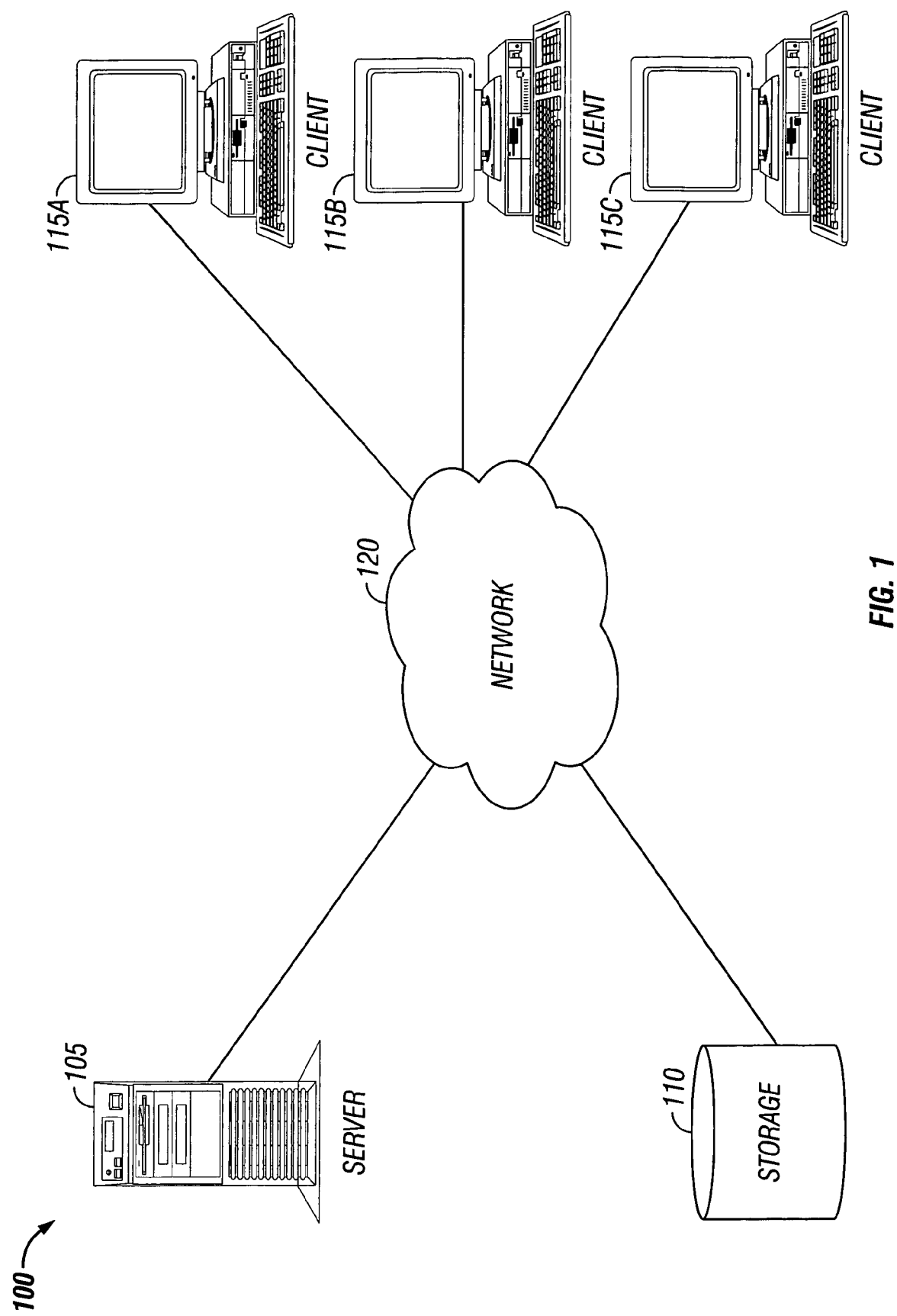
FIG. 1 shows a network for implementing a trusted decision support system.

FIG. 1 shows a network for implementing a trusted decision support system. The decision support system 100 includes a server 105, a storage component 110, client terminals 115A, 115B and 115C, where three client terminals is only used as an example, and a network 120 connecting the other components.

The server 105 contains processing components and software and/or hardware components for implementing the decision support system. The server 105 contains a processor for performing the related tasks of the decision support system. The server 105 also contains internal memory for performing the necessary processing tasks. In addition, the server 105 is connected to an external storage component 110 via the network 120. The processor is configured to execute one or more software applications to control the operation of the various modules of the server as will be discussed below in reference to FIG. 2. The processor is also configured to access the internal memory of the server 105, or the external storage 110 to read and/or store data. The processor may be any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the microprocessor 100 may be any conventional special purpose microprocessor such as a digital signal processor.

The storage component 110 contains memory for storing information used for performing the decision support processes provided by the system 100. Memory refers to electronic circuitry that allows information, typically computer data, to be stored and retrieved. Memory can refer to external devices or systems, for example, disk drives or tape drives. Memory can also refer to fast semiconductor storage (chips), for example, Random Access Memory (RAM) or various forms of Read Only Memory (ROM), that are directly connected to the processor. Other types of memory include bubble memory and core memory.

The client devices 115A-115C represent any type of device that can access a computer network. Devices such as PDA's (personal digital assistants), cell phones, personal computers, lap top computers, set top boxes are examples of devices that could be used as the client devices 115. The client devices will typically have a display device and one or more input devices. For example, the input device may be a keyboard, rollerball, pen and stylus, mouse, or voice recognition system. The input device may also be a touch screen associated with an output device. The user may respond to prompts on the display by touching the screen. Textual or graphic information may be entered by the user through the input device.

The network 120 may include any type of electronically connected group of computers including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). Note that computing devices may be desktop, server, portable, hand-held, set-top, or any other desired type of configuration. As used herein, the network includes network variations such as the public Internet, a private network within the Internet, a secure network within the Internet, a private network, a public network, a value-added network, an intranet, and the like.

Figure 2:
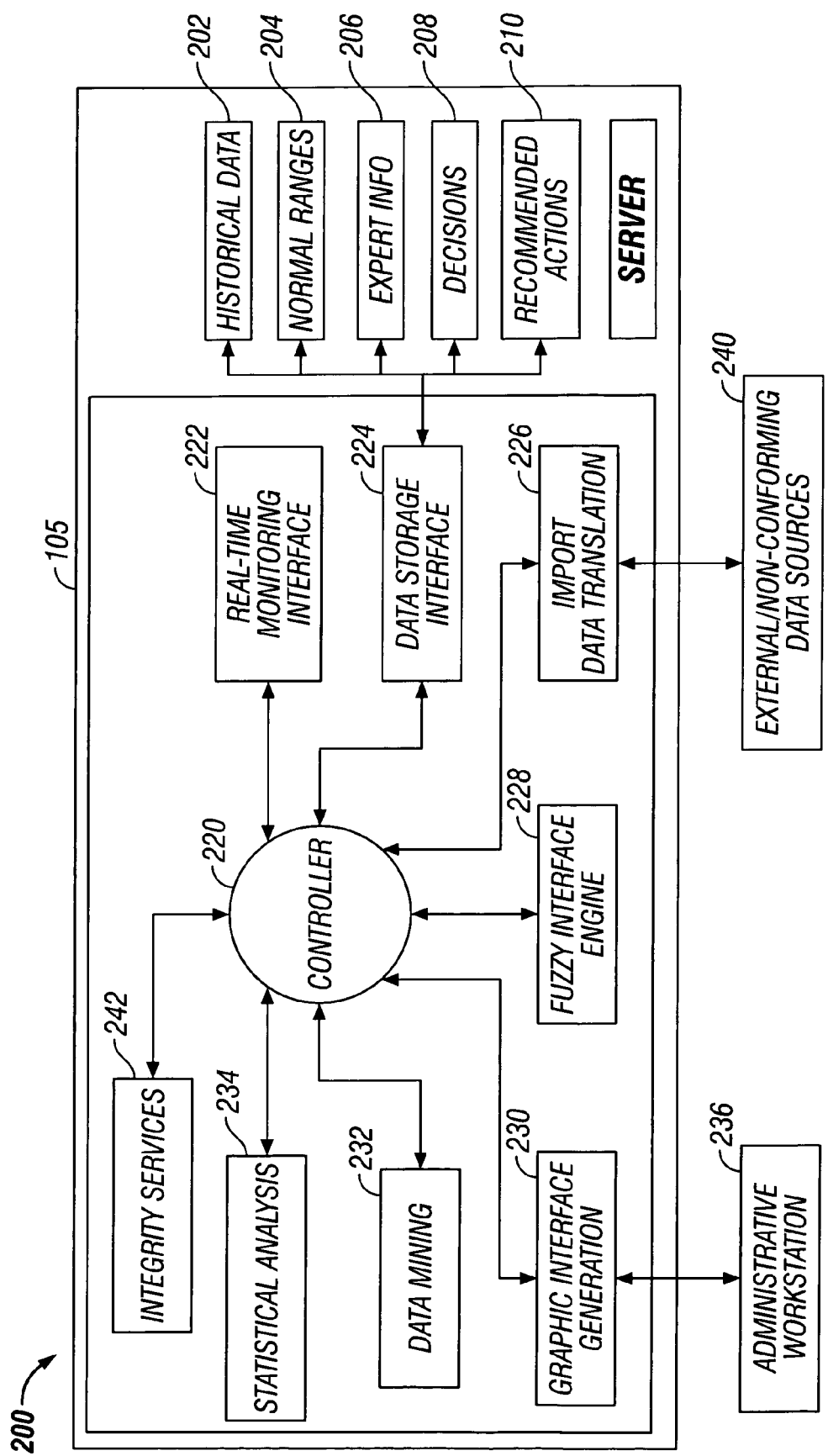
FIG. 2 is a block diagram illustrating certain functional blocks of a server based system for hosting the trusted decision support system.

FIG. 2 is a block diagram illustrating certain functional blocks of a server based system for hosting the trusted decision support system. The system 200 includes the server 105 that is connected, to an administrative workstation 236, and to external data sources 240. The server 105 is comprised of various modules 202-234. As can be appreciated by one of ordinary skill in the art, each of the modules 202-234 comprises various sub-routines, procedures, definitional statements, and macros. Each of the modules 202-234 are typically separately compiled and linked into a single executable program. Therefore, the following description of each of the modules 202-210 is used for convenience to describe the functionality of the server 105. Thus, the processes that are undergone by each of the modules 202-234 may be arbitrarily redistributed to one of the other modules, combined together in a single module, or made available in a shareable dynamic link library. Further each of the modules 202-234 could be implemented in hardware.

The controller 220 serves as the central interface linking the other modules 222-234. The controller 220 coordinates the use of the other modules based on the script instructions that define the task (e.g., an application specific decision support model) that is being processed. The modules 232-234 execute the various functions used to perform the decision support processes. The data modules 202-210 comprise memory that stores previously generated data an is also used to store new data as it is generated by the other modules. The data storage interface module 224 is configured to retrieve and store data to and from the data modules 202-210.

The real-time monitoring interface 222 is configured to monitor multiple disparate data sources in search of information that matches any of several variables that the current decision support model is designed to retrieve. In some embodiments, the real-time monitoring interface 222 retrieves from the disparate data sources that are part of a secure communications network for use with the decision support system. In these embodiments, each of the disparate data sources conforms to a security protocol and a data format. The data that is retrieved by the real-time monitoring interface 222 is forwarded to the controller 220 which then forwards the data for use by other modules or to be stored.

Disparate data sources that are part of a secure communication network may include data sources that are under the control of an organization that controls the communications network that the data is retrieved from. For example, if the decision support system is part of a U.S. government communications network, the following databases may be directly connected to the decision support system and may conform to the security protocol and data format:

FBI's INFRAGUARD database
National Homeland Security database
FAA Airmen Certification database
FAA Registered Aircraft database
SEC filings EDGAR database
TECS US Customs Enforcement database The real-time monitoring interface 222 retrieves data from a set of conforming data sources. In contrast, an import data translation module 226 is configured to retrieve information from non-conforming data sources 240. The information may be any that matches any of the several variables that the current decision support model is designed to retrieve. The non-conforming data sources can be accessed from any of several public, private, secure, and/or non-secure networks such as those discussed above in reference to the network 120 of FIG. 1. Non-conforming data sources may include web pages on the Internet. The Internet contains a plurality of web pages that are searchable by the import data translation module 226. The web pages are virtual documents that each have embedded links which link portions of the virtual pages to other virtual pages and other data. Other examples of data sources that may be accessed using the real-time monitoring interface include private databases such as Lexis/Nexis, Dow Jones, Medline, etc, each of which have different security, quality, structure and subject matter. The import data translation module 226 can traverse the virtual pages and download data that matches any of the several variables that the current decision support model is designed to retrieve. The data that is retrieved by the import data translation module is converted to conform to the same data format that the real-time monitoring interface module 222 uses. The conversion to the conforming format may include classifying portions of the information into the various search variables and then parsing the classified information variables into specific fields of a multidimensional data structure (e.g., fields may include time, location, account numbers, flight numbers, etc.). After the retrieved data is converted to the conforming format, it is forwarded to the controller 220 for use in other modules or to be stored.

In some embodiments, the data that is retrieved by the import data translation component 226 may be of questionable integrity. Networks such as the internet typically employ a base level of protection for transporting data of all kinds. One example is the Transport Control Protocol (TCP). TCP is a transport layer protocol used to provide a reliable, connection-oriented, transport layer link among computer systems. The network layer provides services to the transport layer. Using a two-way handshaking scheme, TCP provides the mechanism for establishing, maintaining, and terminating logical connections among computer systems. TCP transport layer uses IP as its network layer protocol. Additionally, TCP performs functions such as transmission of byte streams, data flow definitions, data acknowledgments, lost or corrupt data re-transmissions, and multiplexing multiple connections through a single network connection. Finally, TCP is responsible for encapsulating information into a datagram structure. An integrity services module 242 is configured to perform the integrity checks of TCP or other types of transport layer protocols known to those of skill in the art (e.g., hypertext transmission protocol, secure: HTTPS). The integrity services module 242 may also be used to authenticate contextual information obtained from non-conforming sources by comparing the non-conformal source information to duplicate information that has been obtained from trusted sources (e.g., sources such as the conformal sources connected to the real-time monitoring interface 222). This type of contextual authentication may avoid the importation of accidentally incorrect information and/or purposefully false information (e.g., information that may have been planted for purposes of disinformation).

In some embodiments, the import data translation component 226 may use methods to convert non-textual information into text to be stored. Many sources of information, especially on the internet, are stored in various forms of multimedia including audio, image, and our video formats. Various methods can be used to convert from a media format to a textual format. These methods include, for example, speech to text methods, voice recognition methods, and image recognition (recognizing faces, and/or objects and classifying them as identified people or things). These types of conversions can be used to classify variables (e.g., time, location, people, and/or objects) discovered in audio files, image files and/or video files, and store them in the various databases, such as the historical data module 202, for later analysis.

The disparate data sources, whether they are of the conforming type or the non-conforming type, preferable come from as many different types of networks and/or systems as possible. The larger the number of disparate data sources, the more chance of that analysis tools such as the complex systems modeling tools and massive correlative analysis tools may uncover correlated events. In some embodiments, the information obtained by the real-time monitoring interface 222 is data sampled by one or more remote monitoring systems and/or remote sensors as described in the U.S. application entitled: TRUSTED MONITORING SYSTEM AND METHOD Ser. No. 11/418,385 and filed on even date. Examples of disparate data sources that may be utilized for several application specific situations are illustrated in FIGS. 5 to 8.

The modules 228, 232 and 234 are analysis components that are used in searching for patterns, correlated events, recommended actions and/or probable consequences using various mathematical methods. A fuzzy inference engine component 228 is configured to analyze any of the newly retrieved and/or stored data according to fuzzy logic rules defined by the specific decision support model that is being executed. Examples of commercially available fuzzy inference engines include: mbFuzzIT, Mentalogic Systems Inc Fuzzy Inference Engine and the Fuzzy Inference Development Environment from Zaptron. Fuzzy logic can be used to represent the correctness of a chain of reasoning connecting a chain of events. The correctness can vary from true (represented by a 1, for example), to false (represented by zero, for example) and may be equal to intermediate values (almost true or almost false). Those of skill in the art will recognize these and other uses of fuzzy logic. Fuzzy logic rules may be used to identify various inferences and/or implications correlated to various chains of events. The various inferences and/or implications may be the recommended actions and/or consequences identified by the decision support model.

A data mining module 232 is configured to analyze data retrieved by the various other modules using tools which look for trends or anomalies without knowledge of the meaning of the data. The data mining module 232 is used to discover patterns and correlations in the large preexisting data modules 202-210 in order to uncover new meaning in data. Examples of commercially available data mining tools include: DataCruncher by DataMind, Darwin by Thinking Machines, and Intelligent Miner from IBM.

A statistical analysis engine 234 is configured to perform statistical analysis for determining probabilities, for example, for use in determining the recommended actions generated by the decision support system. Examples of commercially available statistical analysis tools include SAS/STAT from SAS, MatLAB from MathWorks, and MS Office-Excel from Microsoft.

A graphic interface generation module 230 is configured to present a graphical user interface to a user of the administrative workstation 236 in this example. The graphical user interface enables an administrative user to develop models and use the models for performing the decision support analysis. Examples of commercially available graphical user interface design tools that can be used to generate the graphical user interfaces include CVSgui from WinCVS, System Management Interface Tool from IBM, and Visual Basic from Microsoft.

It should be noted that any one of the functional blocks illustrated in FIG. 2 may be rearranged and/or combined with one or more other blocks without changing the function of the server 200.

Figure 3:
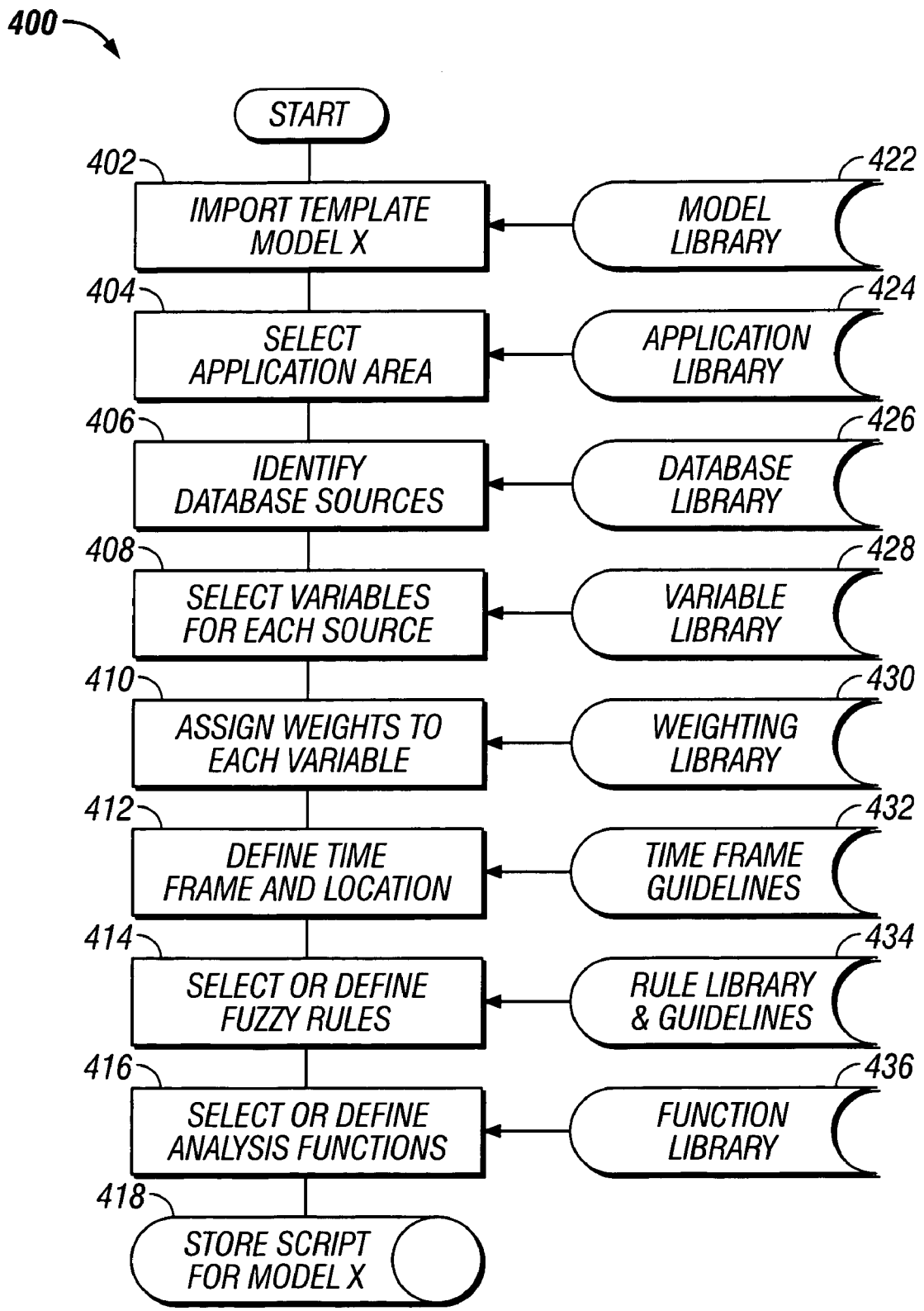
FIG. 3 is a flowchart illustrating certain steps in a process for developing an application specific decision support model.

FIG. 3 is a flowchart illustrating certain steps in a process for developing an application specific decision support model. The process 400 is used to develop a decision support model directed to a specific application for providing guidance and decision making to a user. An application is a scenario that the decision support process is directed at. Examples of applications include the following application areas each listing representative samples of related sub-application components:

1. Flight safety
    a. Vehicle integrity
    b. Passenger integrity
    c. Route integrity
    d. Schedule integrity
2. Cargo logistics
    a. Supplier/manufacturer integrity
    b. Container integrity
    c. Product integrity
    d. Shipper integrity
    e. Handling personnel integrity
    f. Route integrity
3. Crude oil futures
    a. Untapped reserves
    b. Refining capacity
    c. GNP of industrialized nations
    d. Annual vehicle sales
    e. News stories about oil
    f. Annual production of petroleum based products
    g. Financial markets commodity trading volume
4. Financial condition of public companies
    a. Board integrity
    b. Management integrity
    c. Market integrity
    d. Raw material integrity
    e. Stock trading volume
    f. Financial performance
    g. Sector comparables
    h. News reports
    i. SEC filings notations
    j. Legal actions pending The process 400 starts at step 402 where a template of an application model is imported to the design process 400 from a library 422 containing one or more templates of models that can be fine-tuned to fit a given application (e.g., flight safety in this example). FIG. 11 is an example template that can be created for an application by the process 400.

FIG. 11 is a completed template, whereas the templates that are imported at the step 402 are typically blank. A model identification data structure 1105 contains information input by the user to identify the application model being designed.

In this example, the model is an aviation safety model. Referring back to FIG. 11, the templates may contain a basic starting point that allows a user to select from multiple selections at each step, from step 404 to step 416 in this example, of the design process 400. In some embodiments, the templates may each be aimed at a central theme or category that the application areas (see step 404) are centered around. For example, one template may focus around business, another around entertainment and yet another around health.

After a template is imported, the design process 400 continues at step 404 with the selection of the application area of interest. The example template 1100 contains an application data structure 1110 where the application area Civil Aviation is listed. In one embodiment, an application library 424 is a database containing previously identified application areas that will help narrow the design process 400 in subsequent steps. The application area may be a smaller subset of the template category. For example, if the template is aimed at the business category, then the application area may be business ethics, stock market research, real estate investment, and venture capital funding. The selection of the application area may be done in a tiered approach where the entire category is defined as a sort of tree structure with several branches.

Process 400 continues at step 406 with the identification of the database (or simply data) sources. A database library 426 contains a list of disparate data sources that may be utilized. Referring back to FIG. 11, the template 1100 lists three exemplary data sources that could be chosen for the aviation safety application of the example.

The data sources in data structure 1115 include an aircraft data source, an air traffic route data source, and airline maintenance data sources. The database library is preferably an evolving library where new data sources are added whenever they are uncovered in searches of other databases (e.g., new links to associated web pages may be identified during the process of running other related or unrelated decision support models). As more and more data sources become available, the more powerful the resulting decision support system potentially becomes. Preferably, as many data sources as possible are identified at step 406. However, constrains such as time, processing power, security clearance and others may limit the databases that a user selects to include in the application specific model. In some embodiments, the data sources may be categorized into pre-selected categories that are already match to the application area and/or template that the user has selected. The pre-selected data sources may be the result of past success in obtaining relevant information during the execution of other decision support models in the same or similar application areas.

Figure 5:
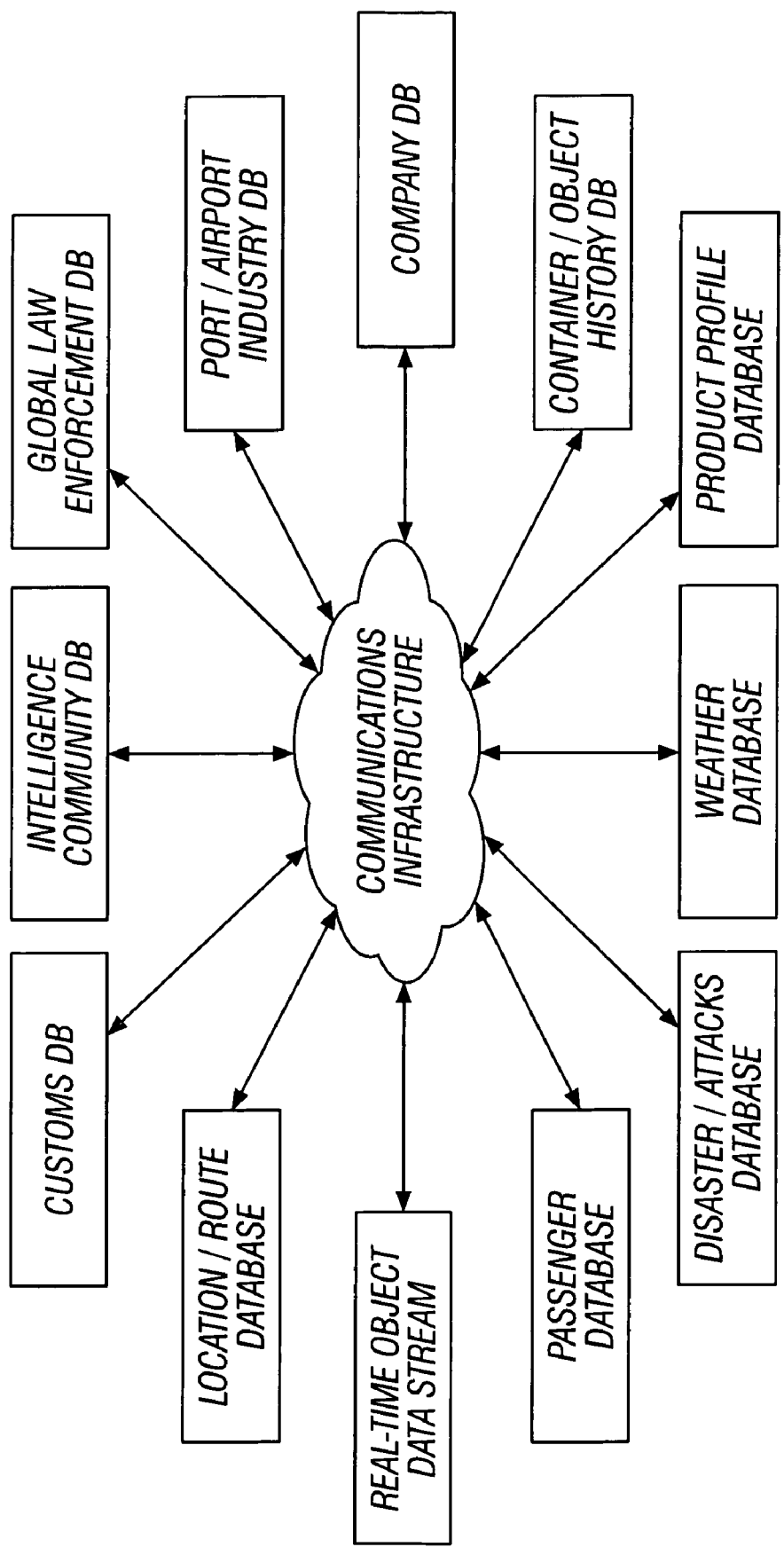
FIG. 5 is a block diagram illustrating certain disparate data sources accessible through a communication infrastructure for performing a decision support process related to an anti-terrorism application.
Figure 6:
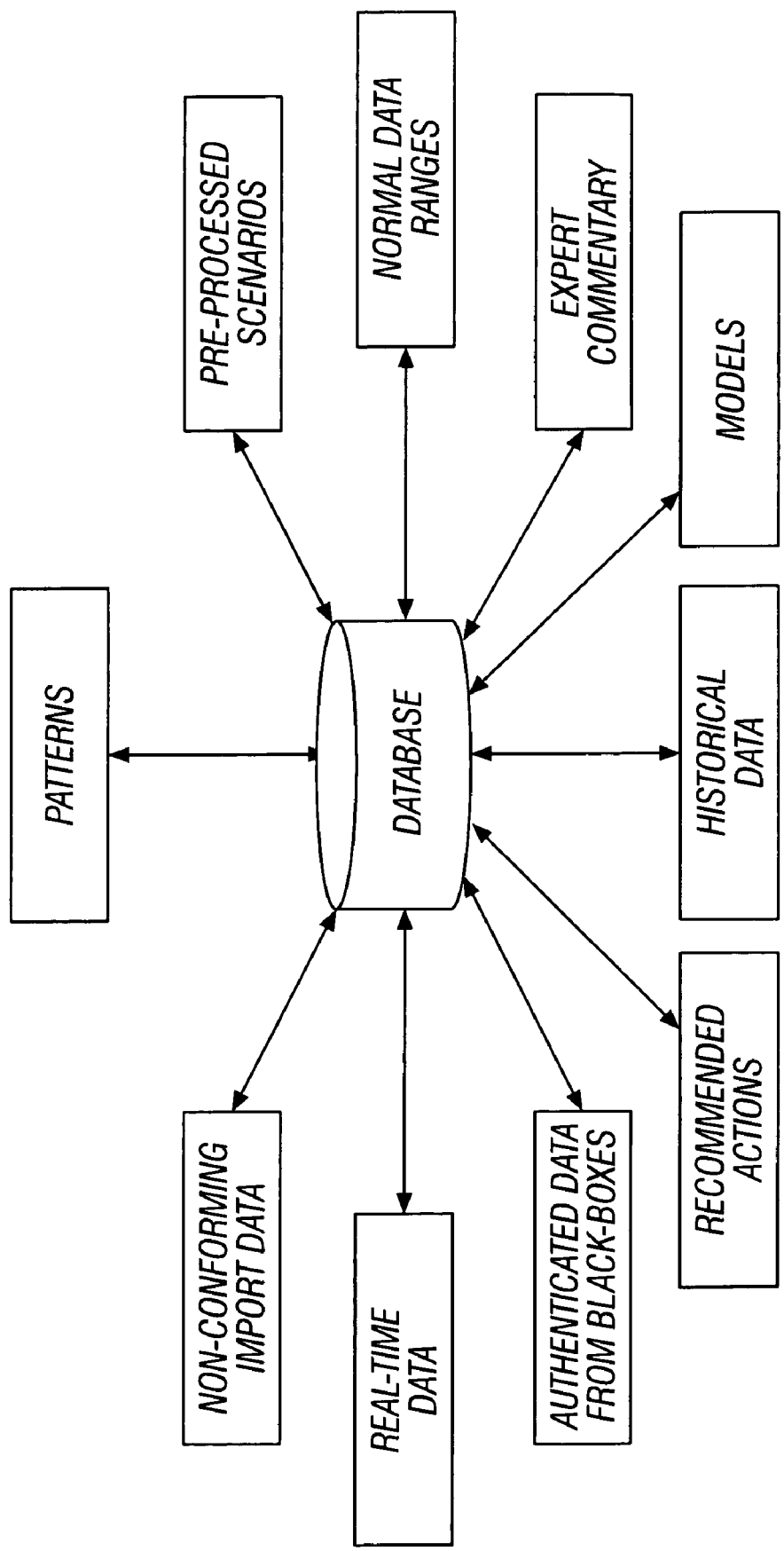
FIG. 6 is a block diagram illustrating certain disparate data sources accessible through a communication infrastructure for performing a decision support process related to a general data types application.
Figure 7:
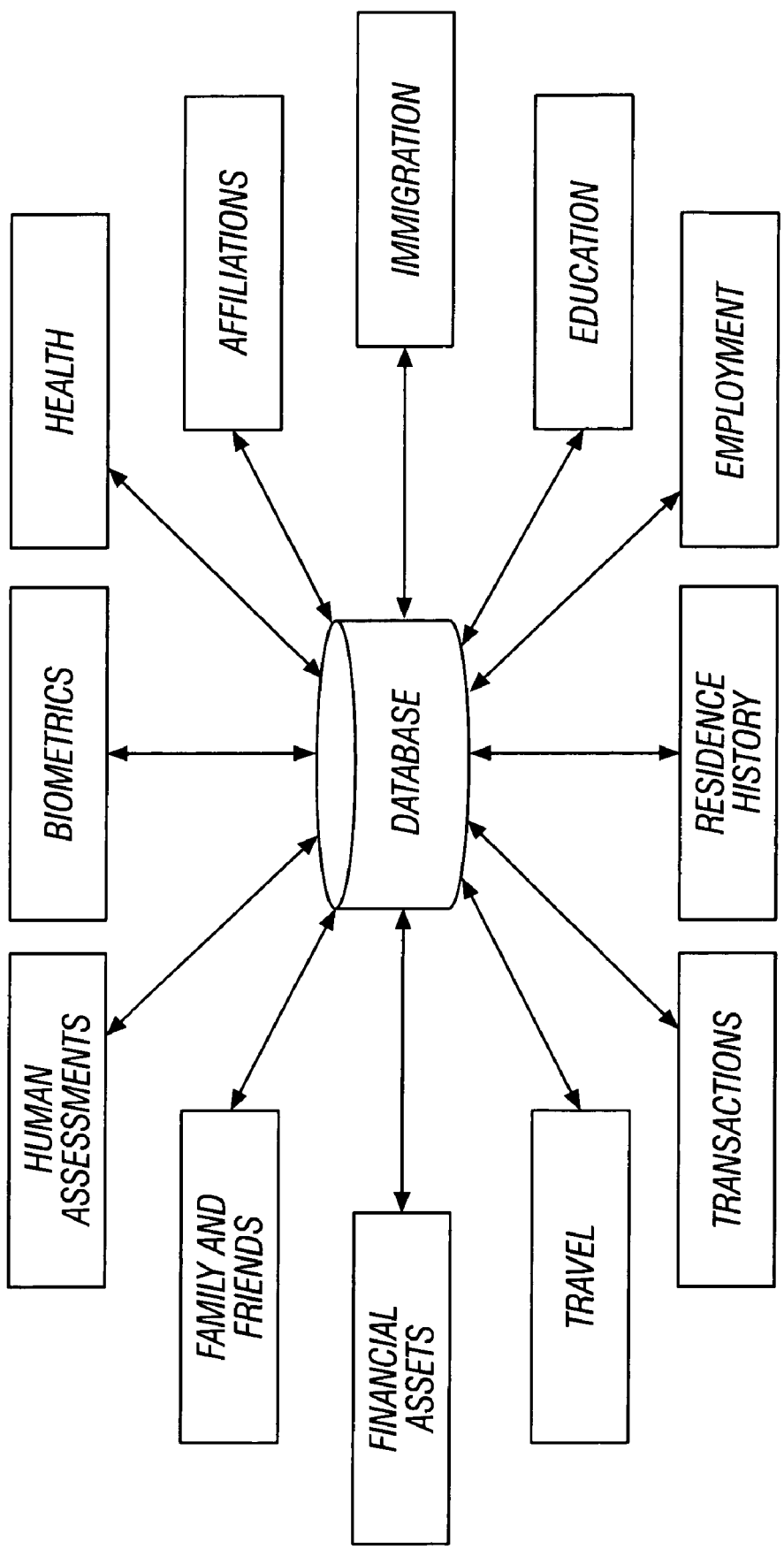
FIG. 7 is a block diagram illustrating certain disparate data sources accessible through a communication infrastructure for performing a decision support analysis related to a human factors application.
Figure 8:
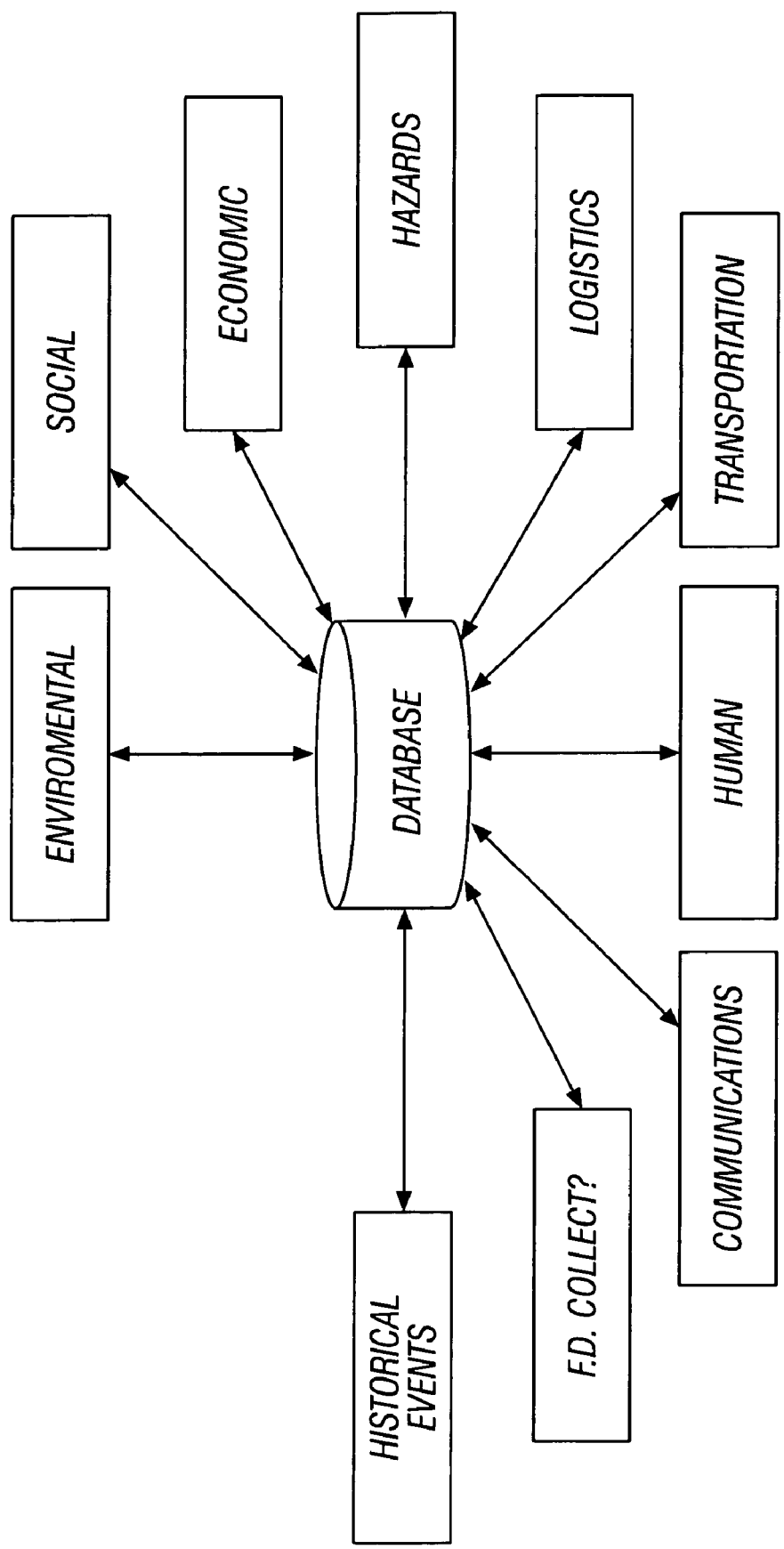
FIG. 8 is a block diagram illustrating certain disparate data sources accessible through a communication infrastructure for performing a decision support analysis related to an ecosystem application.

FIGS. 5-8 illustrate examples of disparate data sources that may be used in designing a decision support system for four specific application areas FIG. 5 is a block diagram illustrating certain disparate data sources accessible through a communication infrastructure for performing a decision support process related to an anti-terrorism application. FIG. 6 is a block diagram illustrating certain disparate data sources accessible through a communication infrastructure for performing a decision support process related to a general data types application. FIG. 7 is a block diagram illustrating certain disparate data sources accessible through a communication infrastructure for performing a decision support analysis related to a human factors application. FIG. 8 is a block diagram illustrating certain disparate data sources accessible through a communication infrastructure for performing a decision support analysis related to an ecosystem application.

The FIGS. 5-8 are simply examples of the types of different data sources that can be selected at step 406 when using the process 400.

Process 400 continues at step 408 with the selection of the variables to be searched for at each source. Some embodiments may search for the same variables on all data sources while other embodiments may specify data source specific variables to be searched. Referring back to FIG. 11, the template 1100 contains a variable data structure 1120. The variables in the data structure 1120 include a vehicle registration number variable, a vehicle model variable and a vehicle payload variable. These are example variable and are not meant to be an exhaustive list.

The variables define the information elements that will be searched for during the decision support process. For example, if the application area is airline flight safety, some of the variables may include airline names, passenger lists, airline accident records, flight numbers, weather, time of year, destination and origination points and many others. A variable library 428 contains information that may be used in selecting the variables at step 408. In some embodiments, the variable library may be an evolving library which includes variables selected by other users when designing their models. The variable library 428 may contain variables categorized under various headings in a tiered hierarchy. For example, a category of personal identification may include variables listed for drivers license variables, birth certificate variables, international visa variables, and or passport variables. The passport variables might contain the following choices:

Passport number
Photograph
First name
Last name
Birth date
Street address, state, zip
Issue date
Issue location
Valid until date After the variables are selected, the process 400 continues at step 410 where weights are assigned to each variable. The weights are used in calculated the relevance of information found at the many disparate sources that were selected at step 406. Higher weights should be given to those variables that are most important to the decision support process. Referring back to FIG. 11, the template 1100 lists the weights assigned to each variable in the variables data structure 1120. A weighting guidelines library 430 contains suggested weightings for variables. The weighting guidelines may be based on the application area, the database source, and other criteria. In some embodiments, the weighting guidelines evolve or develop over time in a training session. The training session may be in the design phase of the model. The training session may continue during actual use by multiple clients. This way the weighting guidelines change as the information and world of events changes.

Time frame limits and location limitations may be defined at step 412. Each application may look at the time variable differently. For example in a flight safety application, the time range may be fairly small with regard to reaching pre-defined waypoints or performing certain aircraft navigation duties. In contrast, the status of a shipping container may be of low interest for weeks at a time but once the vessel comes within a certain range of port, the relevant timeframe may change to minutes. Lastly, the relevant timeframe for a valid passport may be ten years whereas a visa may only be valid for days or weeks. Time frame limits may be added to narrow the searches for predicted outcomes and/or correlated past events to a certain range around the current time that the model is being run. This may be desired in order to save time and/or processing power. Referring back to FIG. 11, the example template 1100 contains a time frame and location limitations data structure 1125 listing some exemplary uses of time and location limitations. In the example template 1100, the searches will be limited to Persons over 18 and present in the US as relevant to any analysis. However, with respect to Aircraft, the search is broadened to include any craft globally with the same model number. Finally, the search will consider any route flown from 1940 to the present in the U.S. to be of relevance. A timeframe guideline library 432 contains suggested time frame limitations for each data type and application area.

Fuzzy rules are selected or defined at step 414. Fuzzy rules may include chains of fuzzy variable membership functions combined with fuzzy logic operations including unions, intersections, and complements or combinations thereof. Fuzzy rules may also include modifiers (e.g., raising membership functions to a power to add a degree of correctness or incorrectness) that may be used to apply the weighting factors assigned in step 410. Referring back to FIG. 11, the template 1100 contains a rules definition data structure 1130 that lists rules sets (identified by rule numbers) for each variable and lists the associated Fuzzy Rules System and/or Application that the rule set numbers relate to. In this example, a Rule Library 434 presents a list of tools, each of which is linked to a series of pre-defined rule sets is used In the first instance, an application Zaptron FIDE that resides on system SuperSam3 is selected and Rule set 87 is used to identify anomalies in the FAA registration database. The rules selection process is continued for each variable or variables with as many rules as needed. A fuzzy rule library may contain guidelines to designing the fuzzy rules in step 414. In some embodiments, the fuzzy rule guidelines contained in the library 434 evolve or develop over time (e.g., during development of the system or during actual use of the system). The basics of fuzzy logic are known to those of skill in the art and will not be discussed in detail.

Similar to fuzzy logic base rules, analysis functions may be designed or defined at step 416. Analysis functions can include probability theory, Boolean logic, data mining and other types of correlative types of analysis functions. Analysis functions can include any of several analysis techniques known to those of skill in the art, such as:

Probability distribution for random variable X
Sampling distribution of the mean
Confidence interval estimation of the mean for (variable X)
Z test of hypothesis for the mean
t Test for the mean difference between (variable X and variable Y)
Autoregressive modeling for trend fitting and forecasting
Residual analysis for the multiple regression The template 1100 contains an analytical process data structure 1135 that lists analytical processes selected for each variable and lists the specific analytical techniques and Systems and/or Applications to be used. In the example template 1100, a Function Library 436 presents a list of tools, each of which is linked to a series of pre-defined analytical analysis sets. In the first instance, a MatLAB7 tool that resides on system BigBlue7 comprising Bayes Function set 45A is selected to identify anomalies in the passenger manifest. The analysis function selection process is continued for each desired variable or variables with as many rules as needed. A function library, 436 contains suggested analysis functions. In some embodiments, the analysis guidelines contained in the library 436 evolve or develop over time (e.g., during development of the system or during actual use of the system).

At the completion of the design process 400, the application specific model (or script) is stored at step 418. The model can be stored in the model library 422 that also stored the template that was used to start the process 400. The model can be loaded from memory to be used by the designer or by other clients depending on the embodiments. It should be noted that any of the steps and/or libraries in FIG. 3 may be rearranged or combined with one or more other steps without changing the function of the process 400.

Figure 4:
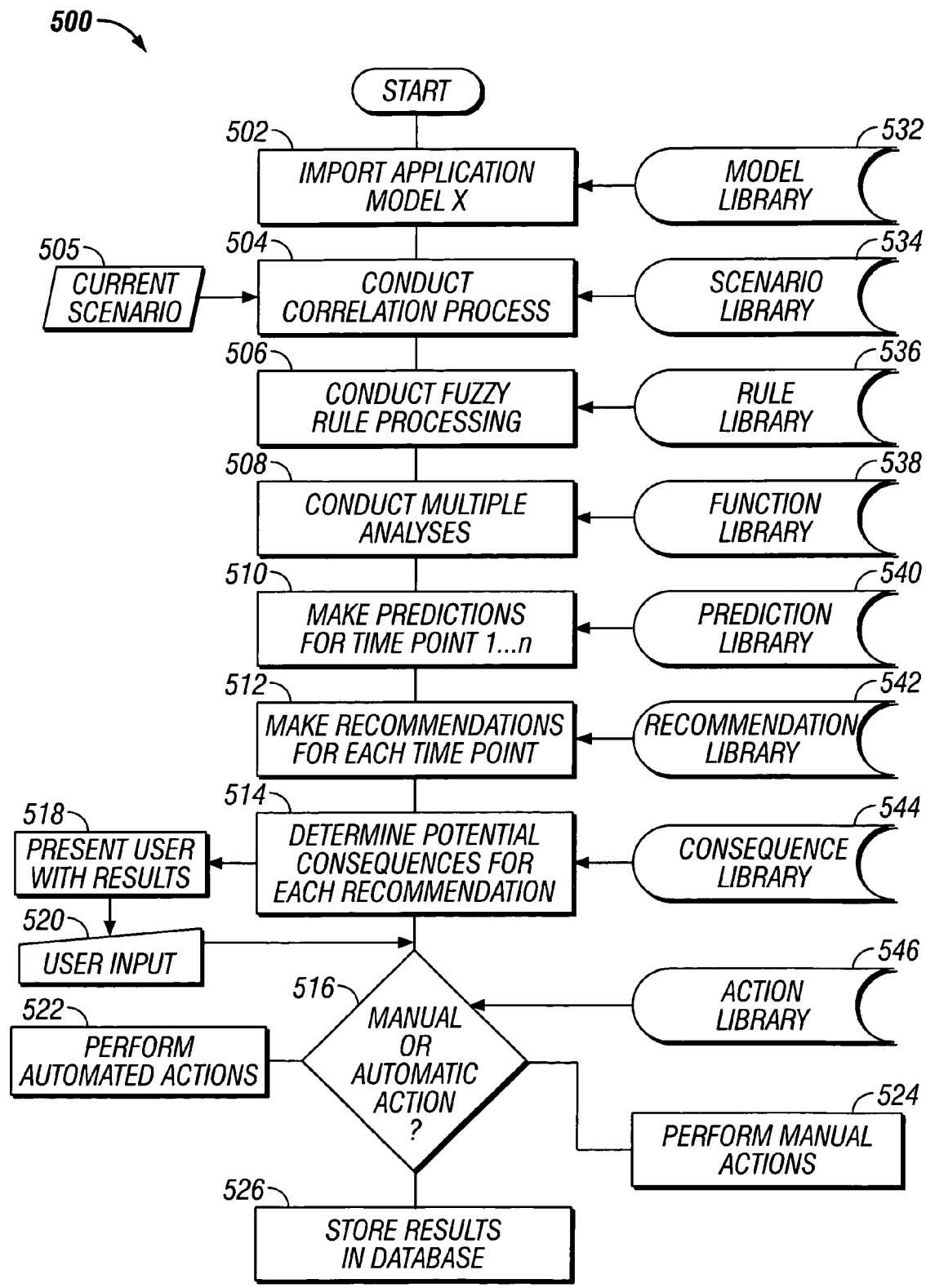
FIG. 4 is a flowchart illustrating certain steps in a process for performing a decision support process using an application specific model developed with the process of FIG. 3.

FIG. 4 is a flowchart illustrating certain steps in a process for performing a decision support process using an application specific model developed with the process of FIG. 3. Process 500 begins by importing an already designed decision support model, created using the process 400, from a model library 532. The model library 532 can be the same as the model library 422 of FIG. 3. The controller 220 of FIG. 2 can perform the importing of the application model. The controller 220 can also coordinate the flow of the process 500 to the other components of the server 200 that can be conducting some or all of the process 500 steps.

After importing the application model, the process 500 continues to step 504 where a correlation process is conducted. Typically, a current scenario 505 of the applicable variables is input to the process 500 in order to perform the correlation acts. The current scenario 505 can include values for each of the selected variables designed into the decision support model being executed (e.g., the variables selected at step 408 in the process 400). The current scenario 505 variables can be updated periodically using the real-time monitoring interface 222 and/or the external/non-conforming data sources component 240 of FIG. 2.

During the correlation process, the current scenario is correlated with previously obtained data contained in the various libraries/storage components such as, for example, a scenario library 534 and/or the historical data module 202 shown in FIG. 2. The data storage interface can retrieve the previously obtained data contained in the libraries and/or storage components. The correlation process preferably uses the weights assigned to each variable, at step 410 in the model design process 400, in calculating the correlations. This way the correlated historical scenarios will be skewed in the direction of the more important variables. Some models can be conducted without weights, or with all weights set to a default value such as one. "Complex Systems Modeling" (e.g., data mining) may be used to identify the correlations between the current scenario data obtained from the multiple disparate data sources and the historical data stored in the scenario library 534. The data mining components 232 of FIG. 2 can be used in performing the correlation tasks of step 504, e.g., using pattern recognition techniques.

In addition, or instead of, the correlative analysis performed at step 504, the process 500 can also conduct fuzzy logic rule processing at step 506 in identifying previously obtained chains of events that may relate to the current scenario 505. The fuzzy rules may be stored in a rule library 536. The fuzzy logic rules can enable the process 500 to identify inferences and/or implications in the historical chains of events and compare these chains of events to the current chain of events as exhibited by the current scenario 505. The fuzzy rules can be designed to reflect the variable weights assigned to the variables in step 410 of the process 400. The fuzzy inference engine 228 can conduct the fuzzy rule processing of step 506.

After identifying historical scenarios that correlate to or are indicated via fuzzy logic rules to relate to the current scenario chain of events, multiple analyses are conducted at step 508. Analyses can include statistical analyses, Bayesian analyses, and/or neural network analyses. A function library 538 contains stored analytical functions used at step 508. In some embodiments, the current scenario data can be analyzed to identify parameters or events that are outside of acceptable normal ranges. The current scenario variables can be compared to the accepted ranges (e.g., historical ranges, calculated ranges etc.) in order to identify outlying characteristics. The normal ranges for the variables in question can be stored in the historical ranges component 204 shown in FIG. 2. In addition to the accepted ranges method of identifying possible non-normal conditions, an expert information database, such as the expert info component 206 of FIG. 2, can be used to identify states that are judged to be unusual by experts of fields that are associated with the application model being executed in the current process. In some embodiments, the expert information database may indicate subjective data values corresponding to states such as "optimal", "danger", "recommended action or other states, that are indicative of the current scenario chain of events 505. These are some examples of the multiple analyses that can be conducted at step 508. Other forms of analyses known to those of skill in the art may also be conducted. The statistical analysis component 234 of FIG. 2 can perform the analyses at step 508.

Based on the multiple analyses performed at step 508, the process proceeds to step 510 where predictions are made as to what the next likely outcome or event will be. The multiple predictions can be made to fit a time limit determined by the step 412 of the process 400 where the time frame to be used in the application specific model was defined. The multiple analyses performed at step 508 can form the basis for predicting the most likely outcomes. In some embodiments, the most probable outcomes identified by the statistical, neural network, and/or fuzzy logic analyses of step 508 are used as the predictions at step 510. A prediction library 540 contains templates that specify one or more parameters and values, one or more formulae, and one or more predictions at specified time points along a projected vector. For example, in flight safety a historical template might read as follows: [PARAMETERS] SPEED: 600 mph ; PITCH: 5 degrees ; ALTITUDE: 5,000 FT [PREDICTION] EVENT: Imminent Crash; TIMEFRAME: 3 minutes, 20 seconds. In some embodiments, the severity of the outcome is contained in the prediction library 540. The severity of the outcome can be a subjective type of measure indicating the extremeness of an outcome, whether positive or negative. For example, an extremely positive outcome could be that the prediction analysis indicates that the user will win the lottery. An extremely negative outcome could be that the user can expect to lose 90% of his investments in the next year. The extremeness of the outcome can be considered when the recommended actions are determined at step 512 and the potential consequences determined at step 514, as discussed below. The statistical analysis component 234, the fuzzy inference engine 228 and/or information retrieved by the controller 220 (using the data storage interface 224) can perform the prediction acts of step 510.

At step 512, recommendations are identified based, at least in part, on their effect on the predicted outcome derived at step 510. Past scenarios that have been identified by the correlation step 504 and or the fuzzy rule processing step 506 can form the basis for making the recommended actions. The recommended actions may be a single action or multiple actions. The recommended actions may include doing nothing. The recommended actions may be made for the range of time selected at step 412 of the process 400. Preferably, the recommended actions are made in parallel with determining the potential outcomes or consequences at step 514. A recommendation library 542 contains a historical record of past recommended actions and subsequent results that are used to affect the recommendations. These historical recommended actions can be identified by links that were identified in the correlation process of step 504. Historical recommendations that resulted in both positive and negative outcomes can be included, preferably with negative outcomes causing a change in the historical recommendation and a positive outcome reinforcing the historical recommendation. The controller 220 can locate and retrieve the historical recommendations from the recommendation actions module 210 shown n FIG. 2. Using these historical recommendations, the controller 220 can make the one or more recommendations at step 512.

As discussed above in relation to making predictions at step 510 and making recommendations at step 512, the potential consequences as well as the severity of the consequences are determined at step 514 (preferable steps 510, 512 and 514 are executed simultaneously such that the severity of the predicted outcomes affect the recommended actins). The consequences are stored in a consequence library 544. The consequences contained in the library 544 are linked to the severity measures discussed above in relation to making the predictions at step 510.

After determining the potential consequences (outcomes) at step 518, the recommended action/consequence results 518 are presented to the user in order to receive user input 520 as to which recommended action to take. The user can be presented the actions/consequences on the display of the client device (e.g., any of client devices 115 shown in FIG. 1). In some embodiments the user is given a choice to select automatic or manual selection of the recommended actions. If the user selects the automatic selection option, a decision block 516 will detect this selection and the process 500 will proceed to step 522 where the recommended action or actions are performed. In some embodiments, the user may be presented with a list of one or more historical scenarios including the recommended actions that were given, the tasks that were performed to carry out the recommended actions and the resulting outcomes. These historical recommended actions may not correspond to the current recommended actions, but are presented to the user so as to let the user observe what outcomes may lie ahead if he were not to perform the recommended actions.

The automatic selection of actions may choose the action(s) that result in a highest risk reward measurement. The risk reward measurement may qualitative measure (e.g., most happy, least injured, etc.) or a quantitative measure (e.g., highest rate of return on investment, lowest mortgage rate, etc.). The automatic selection may, in some embodiments choose the action that results in optimizing a user specified condition, such as, for example, fastest trip to a destination, lowest grocery bill satisfying nutritional needs and others.

If the user selects the manual selection of the recommended actions, then the user also inputs (user input 220) the recommended action. The decision block 516 then causes the process 500 to proceed to step 524 where the manual action is performed. It should be noted that the recommended actions made at step 512 that follow from predictions made at 510 and the tasks entailed in carrying out the recommended actions, at steps 522 or 524, are distinct from each other.

After the selection of the recommended action has taken place, either automatically or manually, the chosen recommended action is stored into the database. In some embodiments, the outcomes resulting from the tasks performed at steps 522 or 524 (the tasks performed to carry out the chosen recommended actions) are also stored at step 526 when the process 500 obtains them. The user may enter outcomes if they are not obtainable by the prediction support system itself. The server executing the process 500 may retrieve the outcome automatically using either the real-tome monitoring interface 222 or the input data translation component 226 shown in FIG. 2.

For actions that can be performed by the server executing the process 500, an action library 546 contains the necessary script commands to perform the tasks needed to carry out the chosen recommended actions. The script commands contain the necessary instructions to perform the needed task(s) whether it is performed at step 522 (automatic) or step 524 (manual).

It should be noted that selecting a recommended action to be performed may not actually cause the corresponding tasks to be performed. In a case where the client device or the server running the process 500 can perform the task, the task can be performed. However, if the recommended action requires the user to physically (or mentally) perform the task, then there is no guarantee that the user will actually perform it.

It should be noted that any of the steps and/or libraries in FIG. 4 may be rearranged or combined with one or more other steps without changing the function of the process 500. Steps 510, 512 and 514 for example can be combined in a way to determine recommended actions based on historical outcomes and the actions taken historically that led to those outcomes. One method of performing these steps starts by identifying a set of past scenarios or chains of events that closely relate to the current scenario 505 (e.g., scenarios identified by the weighted correlation process performed at step 504 and/or the fuzzy rule processing performed at step 506). The identified past scenarios can be stored as chain of event templates, where the chain of event templates each include the historical values of the variables defining the scenario, the action that was taken and the resulting outcome. In one example, the recommended action can be determined by choosing the historic action that led to a desired or most favorable outcome most often. In another example, fuzzy logic can be used to combine multiple actions taken with the desirability of the resulting outcome where the fuzzy logic algorithms provide weighting to the desirability and the type of actions taken. The chain of event templates may also include the action that was recommended (if the scenarios were using the decision support process) in order for the process 500 to be able to identify cases where the recommended action does not correspond to the action that was taken. This may avoid false feedback where a recommended action was ignored and a negative outcome resulted.

New chain of event templates are created when no past chain of event scenarios match the current scenario 505. Existing chain of event templates can also evolve to be substantially different from when they were first created. This can be the result of parameters outside of the control of the user or the process 500 evolving to create a substantially different set of rules that control the chain of events scenarios that are represented by the templates.

In some embodiments, the application models developed using the process 400 and executed with the process 500 can be structured to resemble a goal-seeking system that begins the process by querying the user for the desired outcome. The process then obtains the values of the variables in the current scenario 505 and compares those values to the variables consistent with the values of the desired outcome. The process 500 described above then seeks to find scenarios (chains of events) that will identify actions to be taken to transition the current scenario toward the desired scenario. There will typically be multiple paths to get to the desired result. The application model can query the user on how he would prefer to get to the goal. The goal can be achieved while optimizing certain characteristics or variables of the application specific model. For example, in an investment application, the goal may be to double the value of an investment in 5 years. The decision support process can identify multiple recommended actions (e.g., investing in highly aggressive or conservative investments) that are chosen to minimize risk, maximize gain, provide less than a certain threshold chance of losing all of the initial investment. In some embodiments, the goal can be open-ended or indefinite. The goal may be to optimize a subjective quality. For example, the goal may be to arrive at a destination in the fastest time, in the least dangerous fashion, in the most comfort, etc. In these situations, fuzzy logic may be used to identify the chain of events that best meet the chances of arriving at the desired destination while optimizing the subjective quality.

Figure 9:
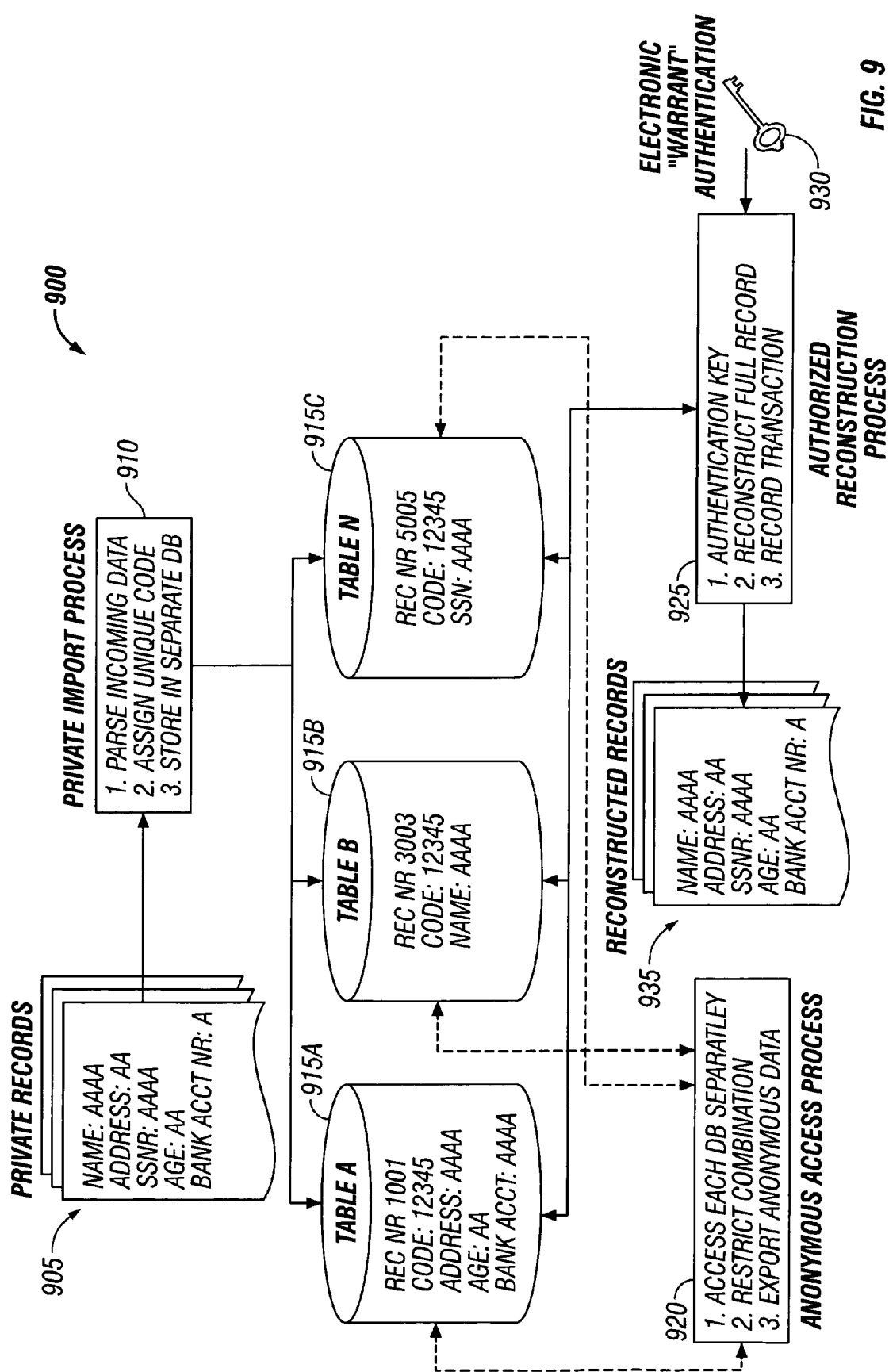
FIG. 9 is a flowchart illustrating certain steps in a process for parsing private information and storing it in segregated databases, where the databases can be accessed in an anonymous mode to retain personal privacy, or accessed in an authorized mode that reconstructs the private information including the personal identity.

Special consideration to a person's privacy (or other private information such as top secret materials) may be a desirable feature for some applications of the decision control process 500. For example, a person's private information can be stored such that the private and/or sensitive information is made available for analysis and identification of correlated scenarios that match a current scenario, but at the same time keep the person's identity separated from the private and/or sensitive information. FIG. 9 is a flowchart illustrating certain steps in a process for parsing private information and storing it in segregated databases, where the databases can be accessed in an anonymous mode to retain personal privacy, or accessed in an authorized mode that reconstructs the private information including the personal identity.

The process 900 obtains private records 905 containing a personal identity and information concerning various facts about the person. The information may include sensitive or private information that a person has the right to keep private unless mitigating circumstances exist. Sensitive information may include financial information, criminal records, a record of associations or acquaintances, social security number etc. The information by itself is not an issue. It is only when the information is linked with an identity of an individual that privacy becomes a concern. For this reason, when private information is imported to the decision support system (e.g., retrieved by the real-time monitoring interface component 222 and or the import data translation component 226 of the server 105 shown in FIG. 2), a private import process 910 is performed. The private import process 910 starts by parsing the incoming data. The data is parsed to a level needed to keep the identity separate from sensitive or private information. A unique code is assigned to link the identity to the parsed information. Identities and codes may be stored in separate, secure databases with restricted access. True identities are only revealed where special conditions are met, such as securing a warrant. Warrants may be represented as electronic keys to streamline automated processing without compromising security. After parsing, the information is stored into any of several separated databases such as the databases 915A, 915B and 915C. The databases 915A to 915C can be stored on any kind of memory device such as hard drives, CD-ROM, magnetic tape, etc. The information is stored in a data structure that links the unique code with the information.

The information in the individual databases can be retrieved (e.g., in order to perform correlative analysis, making predicted outcomes, making recommendation of the process 500) separately by proceeding to block 920. The separate databases do not contain enough information to link the person with the individual facts or events. Data from multiple databases may be combined in a restricted way such that the chains of events used in the decision support process 500 can be identified without connecting a personal identity to the chain of events. This allows the data-mining or exportation of anonymous data.

In certain critical situations, such as when a person's safety is involved, or in cases where a criminal act has been committed, the reconstruction of the private records 905 may be permitted. Such a situation is similar to the issue of a warrant or a subpoena. An electronic warrant key is used to authorize, authenticate and/or permit decryption of information (e.g., access codes or cryptographic keys) to allow reconstruction of the private record for which the authorization was granted 905. The authorization/authentication act is typically a recorded transaction that is kept in a secure database for purposes of providing an audit trail. When the electronic warrant 930 is obtained, the process performs step 925 where authentication of the warrant 930 is performed and the subsequent reconstruction results in reconstructed records 935. Step 925 is able to access multiple data bases as well as link the data in each database to the identification of the person that it is linked to. Obtaining the reconstructed records 925 that include the personal identity variable enables the use of the identity of the person as a variable in the decision support process 500. It should be noted that any of the steps and/or libraries in FIG. 9 may be rearranged or combined with one or more other steps without changing the function of the process 900. While the process 900 was described in relation to parsing information to keep the information separate from a person's identity, those of skill in the art will recognize that other forms of sensitive information can be protected in a similar manner. For example, the authorization warrant methodology can also be used to restrict access to other forms of private information. For example, governmental top secret information may be accessed only by authorized individuals. Similar protection may be afforded sensitive information such as company trade secrets, secret negotiations, etc.

Figure 10:
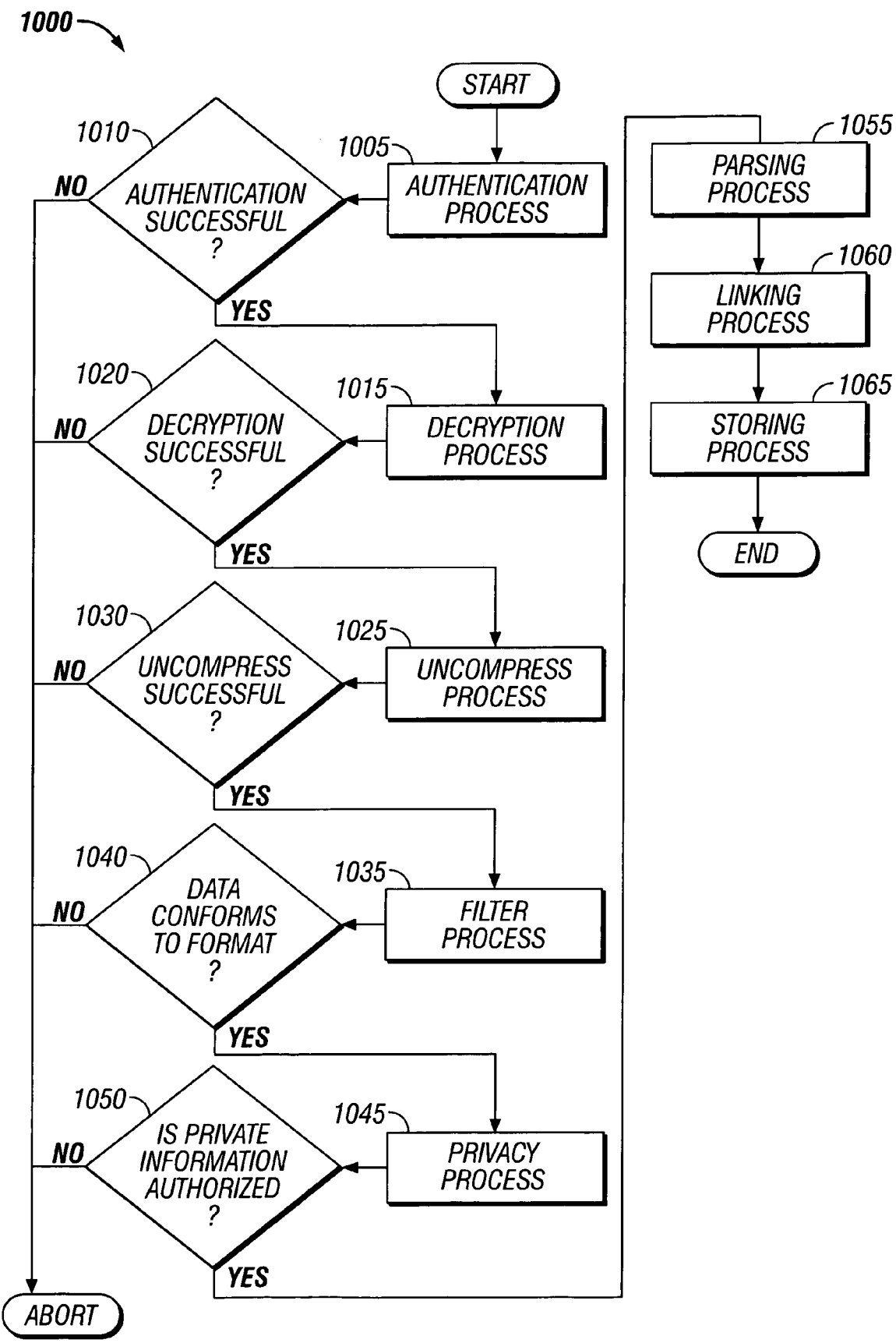
FIG. 10 is a flowchart illustrating certain steps in a process for obtaining information for use in a decision support process.

FIG. 10 is a flowchart illustrating certain steps in a process for obtaining information for use in the decision support process. The process 1000 can be performed by the server based system 200 shown in FIG. 2. Preferably, any information that is retrieved by the system 200 performs all of the steps shown in the process 1000. However, some steps may be omitted without changing the function of the process 1000. The information may be retrieved by the real-time monitoring interface component 222 and/or the import data transaction component 226. The process 1000 starts with an authentication process 1005. The authentication process verifies the source of the retrieved information. The authentication process confirms that the received data is unchanged from what the source transmitted and it also confirms the identity of the source. In some embodiments, the sender uses a one-way hash function to generate a digital signature from the transmitted data. The sender then encrypts the hash-code with a private key. The receiver (e.g. the server based system 200) then recalculates the digital signature from the data and decrypts the received digital signature with the sender's public key. If the two digital signatures are equal, the receiver can be confident that data has not been corrupted and that it came from the given sender. The integrity services module 242 may perform the authentication at step 1005.

By proceeding to decision block 1010, the process 1000 checks if the authentication was successful. If the authentication was not successful, the process 1000 is aborted and the retrieved information may be discarded. The retrieved information may also be retained to be used later.

If the authentication was successful, the decision block 1010 directs the process 1000 to proceed to a decryption process 1015. The decryption process 1015 decrypts the information. The integrity of the decrypted data is typically verified through the use of checksums (e.g., cyclic redundancy checks). If portions of the decrypted data are determined to be erroneous, decision block 1020 will determine that the decryption was unsuccessful for that portion of data and abort the process (discard the erroneous portions of data) as it pertains to the erroneous data. The integrity services module 222 may perform the decryption at step 1015.

After successful decryption of the information, the decision block 1020 directs the process 1000 to a decompression process 1025. Any of the various compression/decompression algorithms can be used to compress information depending on the type of media that is being compressed. If decompression is unsuccessful, the decision block 1030 causes the process 1000 to be aborted, at least for the portion of information that was unsuccessfully decompressed. The integrity services module 222 may perform the decompression at step 1025.

After successful decompression of the information, the process 1000 proceeds to a filtering process 1035. The filtering process can perform the reformatting tasks discussed above in relation to the import data translation module 226. The data is filtered so as to conform to the format desired by the decision support system 200. If the filtering at step 1035 is determined, at decision block 1040, to be unsuccessful in translating the information into a conformal format, then the process 1000 is aborted, at least for the portion of information that was not successfully filtered.

After successful filtering of the information, the process 1000 proceeds to step 1045 where the privacy process 900 shown in FIG. 9 is performed. The privacy process 1045 can be performed in at least two exemplary ways. In one example, the privacy process 1045 is used to reconstruct the private information (see the reconstructed records 935 in FIG. 9) retrieved from the already parsed databases (e.g., the databases 915A, 915B and 915C). In this case, decision block 1050 checks to see if the proper authorization warrant 930 is available. If the authorization warrant 930 is not available, the decision block 1050 aborts the process 1000 as it relates to obtaining the reconstructed records 935. If the private information is determined to be authorized to be obtained, then the decision block 1050 directs the process 1000 to a parsing process 1055. In a second example, the privacy process 1045 is used to determine if there is private information contained in the retrieved information that needs to be parsed before the data is stored for use in the decision support system. In this case, the decision block 1050 determines if the private information (e.g., personal identity information) has been identified (e.g., flagged) to be parsed into the secure personal identification/unique code database that was discussed above in relation to FIG. 9. This way the parsing process 1055 can recognize that there is personal identity information present and the unique code can be linked to the parsed information to separate the information from the personal identity. If the personal identity information is properly identified, then the process 1000 proceeds to the parsing process 1055.

The parsing process 1055 performs parsing of the received information into the various variables that are used to identify related chains of events in the process 500 discussed above. At step 1060, the parsed information is then linked to classifications of the data structure to be used for the decision support process. The linking can be in the form of cross references to the various application specific model templates that the information may be relevant to. The linking can be in the form of cross references to the individual chain of events templates used in determining the predicted outcomes and the recommended actions of the process 500. The linking can also be in the form of cross references to the various libraries used in the process 400 for developing the application specific models.

After linking the parsed information, the process 100 proceeds to step 1065, where the information is stored in to the multidimensional data structure to be used in the processes discussed above. It should be noted that any of the steps in FIG. 10 may be rearranged or combined with one or more other steps without changing the function of the process 1000.

An exemplary use of some of the features of the decision support system discussed above will now be described. This example describes a scenario for monitoring a shipping container. History of accident or disaster investigation has shown us that connections between seemingly unrelated or insignificant events play a major part in the failure of the entire safety system. One such example of the nature of humans to mistake very vital clues and relationships of key factors in a disaster was the crash of Alaska Airlines flight 261 Jan. 31, 2000 that killed all 88 people aboard the aircraft.

The initial investigation of the flight records and aircraft wreckage showed significant signs pointing to mechanical failure. Specifically, the National Transportation Safety Board concluded that a flight control system inside the horizontal stabilizer called a jackscrew and gimbal nut assembly failed during flight in the tail of the MD-83. Analysts concluded that the jackscrew had torn through the badly worn nut causing the horizontal stabilizer, the flight control that regulates the pitch of the nose, had jammed in the full nose down position causing the aircraft to dive into the ocean.

More than six years after the accident there has still not been advances in the sensor technology on aircraft that would have warned the pilots that the jackscrew would be under enough stress to strip the gimbal nut assembly causing a catastrophic failure.

Conversely, over the same six year period, data gathering, data mining, decision tree analysis, neural networks, and threat mitigation algorithms have enjoyed great increases in sophistication. This path of continued improvement has lead to the present invention. The following is an example of how the present invention would have illustrated the full extent of the risk associated with flight 261 and how the flight crew and public would have been presented with the risks involved with Alaska Airlines as a corporation, and with the entire US airline industry at the time.

Jan. 31, 2000 0900-PST

The pilot arrives at the aircraft to perform the routine preflight checks of the aircraft. As the system powers up, the Trusted Decision Support System has pre-assigned the subject being analyzed as aircraft safety of flight. The decision support system references the model library and selects the script designated for the aviation safety model.

The model for aviation safety identifies areas specific to aviation safety that must be analyzed by the system. For example, one aspect of the model instructs the system to reference the FAA Airmen Certification Database using the pilot information for the crew assigned to flight 261. The airmen certificate number, the pilot name, and the airline employee identification number are used to research the pilot flight test records, the pilot citation records, pilot citation records, pilot training records, pilot conduct records, and pilot performance records, aircraft flown records, and type rating records. The decision support system then references the scenario library while conducting a correlation process between the information in the library and the information provided about the flight crew. The rule library is referenced for allowable parameter values and a customized set of rules regarding the flight crew is established for the flight. The value of parameters are evaluated against the fuzzy rule set to determine if any value is outside the established allowable values. For example, rules for this flight based on the historical values given from the scenario library dictate that the crew must have 10 hours of off duty rest period between block times in the aircraft. The pilot information database confirms 11.5 hours between the aircraft shut down, the crew arrival, and aircraft restart. This variable would be evaluated as a non-anomaly based on it falling within the parameters allowed by the established rule set.

The process of establishing rule sets and evaluating parameter values is performed throughout all the requirements of the aviation safety model.

The aviation safety model used in this scenario calls for the maintenance records of the specific MD-83 aircraft scheduled for flight 261 to be referenced. The rule library for this scenario dictates that the variable may not have any instances of required maintenance work going undone. The referenced maintenance records indicate that in September 1997 mechanics at the Alaska Airlines Oakland maintenance facility discovered that the gimbal nut on the horizontal stabilizer was "badly worn and in dire need of replacement." The same maintenance records showed that Alaska Airlines ordered additional tests on the assembly and deemed it airworthy with no maintenance action required. The rule set for this scenario calls for no deviations from required maintenance actions. This event would be flagged as negatively effecting the safety of flight for this aircraft Data collected from grand jury investigations showed that Alaska Airlines had allowed more that 840 flights by two MD-80 series jetliners "in an unairworthy condition" between October 1998 and January 1999. The rule set for the Aviation Safety model states that no unairworthy aircraft are permitted to fly at any time. The information from the investigation would be flagged by the system as negatively effecting the safety of flight.

According to the aviation safety model, records from the FBI would be referenced in the correlation and data gathering process. The FBI records show that in December of 1998 the Alaska Airlines Corporate headquarters in Seattle were raided based on charges filed by the President of the Local Machinists Union and senior aircraft mechanic John Liotine that "supervisors and mechanics were signing off work that they were either unqualified to do, or had not performed, so that planes could be put back into service as soon as possible." The rules for this variable state that any investigation by the FBI as well as any accusations by current or former employees are labeled as a negative influence on the safety of flight.

In February 1999 the FAA database for airline citations shows that Alaska Airlines allowed aircraft to fly despite falsified maintenance checks that included work by an Alaska Airlines supervisor who was not qualified to perform such work. According to the rules for this variable, one airline citation is outside the allowable value range for the variable. This variable would be flagged as negatively effecting the safety of flight.

The system references a function library to conduct multiple levels of analysis regarding the information provided in the correlation process and the variable rule processing stages.

The system references a prediction library to base probabilities of event occurrence based on current variable values.

The system references the time when the pilot activates the electrical system of the aircraft as the starting point to reference the flight timeline against. All predictions made for this flight from the prediction library are linked to a predicted time of occurrence related to this timeline.

Jan. 31, 2001 0901-PST

Each event is linked to a list of consequences related to that recommendation via the consequence library.

Jan. 31, 2001 0902-PST

The pilot is presented a score based on the risk factors for the flight, and given a list of events and their corresponding probability score. Each event listed is given a time of occurrence and is linked to a list of recommendations from the recommendation library.

Jan. 31, 2001 0903-PST

The crew is presented with a list of actions, both manual and automatic for them to choose from to lessen the risk associated with this flight.

Jan. 31, 2001 0915-PST

The crew has performed all actions listed on the actions page and permitted the automated systems to perform all available actions automatically.

Jan. 31, 2001 0916-PST

The actions of the crew, and the results of the actions are stored in the database for the flight and the process is reset automatically updating with each change in any observed variable in the aviation safety model.

Had the flight crew seen the risk report and list of probable failures and the likelihood of those failures occurring, they may not have chosen to make the flight. However, for the example, it is assumed that the flight has occurred.

Inside the flight deck the system constantly updates the information provided by the prediction system, along with readings from the avionics systems aboard the aircraft. Current conditions and flight system information is run through the fuzzy rule process based on information from the rule library. Each variable is assessed through the fuzzy rule set to determine whether its value falls within the allowable parameter value limits. For example, the control pressure for pitch attitude has a limit of 100 pounds of force required at the control input end to manipulate the control. The system was on autopilot, so no control input should have been taking place. However, due to the malfunction of the pitch attitude control mechanism, constant input from the trim system was required to maintain aircraft attitude.

Jan. 31, 2001 1230-PST

The pitch trim force required variable observed to be within the allowable fuzzy rule parameters. The analysis of the system, and the prediction process show that according to the current patterns, the pitch trim force required to maintain level flight will exceed the allowable parameter value limits in one hour and 45 minutes of flight.

Jan. 31, 2001 1231-PST

The system determines the recommended actions according to the timeline established by the prediction process. The consequence library is used to determine potential consequences for each action performed by the crew, automated systems, and failures of systems and their interdependent systems.

Jan. 31, 2001 1232-PST

The crew is alerted about the results of the process and prompted to acknowledge the severity of the consequences of the predicted system failures. Both manual and automatic actions are performed to mitigate the risks associated with the failure.

Jan. 31, 2001 1232-PST

The FAA, emergency crews at the nearest airports, search and rescue personnel, aircraft experts, airline emergency maintenance personnel, and airline crisis management teams are all notified of the situation. Each entity is updated with complete information automatically relayed to and from the aircraft. The timeline for failure is constantly updated with each action taken by the flight and ground crews.

The system has alerted the pilots and all appropriate parties of the impending failure and its consequences 1:56 minutes prior to the actual point of failure. Based on the actions recommended by the decision support system, the crew is able to adjust the flight controls on the aircraft to minimize the forces acting upon the horizontal stabilizer. Furthermore, the aircraft is diverted to the nearest location, landing safely in San Diego, 42 minutes prior to the point of failure.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A decision support system, comprising:
a database containing data from a plurality of disparate data sources; and
an electronic device configured to classify the database data and assign weighted values to the data based at least in part on the classification, the electronic device further configured to analyze the database data so as to provide at least one recommended action and outcome information for the at least one recommended action.

2. The system of claim 1, wherein the database data comprises at least one of location data, real-time sensor data, legacy computer data, relational database records, flat-file database records, non alpha-numeric data, and unstructured data.

3. The system of claim 1, wherein the disparate data sources comprise at least one of an internet source, a real-time sensor, a computer database, a relational database, and a flat-file database.

4. The system of claim 1, wherein the system is further configured to store actual outcomes of previously stored and performed recommended actions, and the at least one recommended action is based at least in part on the stored actual outcomes.

5. The system of claim 1, wherein the system is configured to initiate the at least one recommended action according to at least one of an input from a user and preprogrammed instructions without user input at the time of initiating the at least one recommended action.

6. The system of claim 1, further comprising a statistical analyses engine configured to be programmed with one or more models, wherein each model comprises mathematical instructions for processing the database data.

7. The system of claim 6, wherein the mathematical instructions comprise weights assigned to database data according to at least one of the data source from which the database data was received and the age of the database data.

8. The system of claim 6, wherein the mathematical instructions comprise at least one of fuzzy logic instructions, Bayesian analyses instructions, neural network analyses instructions, probability calculation instructions, mean calculation instructions, confidence interval calculation instructions, Z-test instructions, T-test instructions, autoregressive modeling instructions, and residual analysis instructions for multiple regression.

9. A decision support system, comprising:
a sensor network;
a database configured to store data from the sensor network; and
an electronic device configured to classify the database data and assign weighted values to the data based at least in part on the classification, the electronic device further configured to analyze the database data so as to provide at least one recommended action and outcome information for the at least one recommended action.

10. The system of claim 9, wherein the sensors are configured to sense disparate inputs.

11. The system of claim 9, wherein the database data comprises at least one of location data, real-time sensor data, legacy computer data, relational database records, flat-file database records, non alpha-numeric data, and unstructured data.

12. The system of claim 9, further comprising an actual outcome database, wherein the system is configured to store actual outcomes of performed previously recommended actions, and the recommended action is based at least in part on the stored actual outcomes.

13. The system of claim 9, wherein the system is configured to initiate the recommended action according to at least one of an input from a user and preprogrammed instructions without user input at the time of initiating the recommended action.

14. The system of claim 9, further comprising a statistical analyses engine configured to be programmed with one or more models, wherein each model comprises mathematical instructions for processing the database data.

15. The system of claim 14, wherein the mathematical instructions comprise weights assigned to database data according to at least one of the data source from which the database data was received and the age of the database data.

16. The system of claim 14, wherein the mathematical instructions comprise at least one of frizzy logic instructions, Bayesian analyses instructions, neural network analyses instructions, probability calculation instructions, mean calculation instructions, confidence interval calculation instructions, Z-test instructions, T-test instructions, autoregressive modeling instructions, and residual analysis instructions for multiple regression.

17. A goal seeking system comprising:
an action database comprising database actions;
an outcome database comprising outcomes associated with the actions; and
an electronic device configured to receive target goal information, the electronic device configured to provide at least one recommended action from the action database to achieve the target goal.

18. The system of claim 17, further comprising a statistical analyses engine configured to be programmed with one or more models, wherein each model comprises mathematical instructions for processing the target goal information, the database actions, and the outcomes.

19. The system of claim 18, wherein the mathematical instructions comprise weights assigned to database actions according to the age of the database actions.

20. The system of claim 18, wherein the mathematical instructions comprise at least one of fuzzy logic instructions, Bayesian analyses instructions, neural network analyses instructions, probability calculation instructions, mean calculation instructions, confidence interval calculation instructions, Z-test instructions, T-test instructions, autoregressive modeling instructions, and residual analysis instructions for multiple regression.

21. A decision support system, comprising:
a database containing data from a plurality of disparate data sources; and
an electronic device configured to analyze the database data so as to provide at least one recommended action and a plurality of recommended tasks to perform the recommended action,
wherein the electronic device is further configured to perform at least one of the recommended tasks.

22. The system of claim 21, wherein the electronic device is further configured to correlate related database data and to predict future outcomes based on the correlation.

23. The system of claim 21, wherein the disparate data sources comprise at least one of an internet source, a real-time sensor, a computer database, a relational database, and a flat-file database.

24. The system of claim 21, wherein the system is configured to initiate the at least one recommended action according to at least one of an input from a user and preprogrammed instructions without user input at the time of initiating the at least one recommended action.

25. The system of claim 21, further comprising a statistical analysis engine configured to be programmed with one or more models, wherein each model comprises mathematical instructions for processing the database data.

26. The system of claim 25, wherein the mathematical instructions comprise weights assigned to database data according to at least one of the data source from which the database data was received and the age of the database data.

27. The system of claim 25, wherein the mathematical instructions comprise at least one of fuzzy logic instructions, Bayesian analyses instructions, neural network analyses instructions, probability calculation instructions, mean calculation instructions, confidence interval calculation instructions, Z-test instructions, T-test instructions, autoregressive modeling instructions, and residual analysis instructions for multiple regression.

* * * * *

UNITED STATES PATENT AND TRADEMARK OFFICE
CERTIFICATE OF CORRECTION

| | | |
|---|---|---|
| PATENT NO. | : 7,526,455 B2 | Page 1 of 1 |
| APPLICATION NO. | : 11/418448 | |
| DATED | : April 28, 2009 | |
| INVENTOR(S) | : Greg Benson et al. | |

It is certified that error appears in the above-identified patent and that said Letters Patent is hereby corrected as shown below:

At Column 23, Line 37, please delete "frizzy" and insert therefore, --fuzzy--.

Signed and Sealed this

Tenth Day of November, 2009

David J. Kappos
*Director of the United States Patent and Trademark Office*